United States Patent
Hwang et al.

(10) Patent No.: US 9,768,898 B2
(45) Date of Patent: Sep. 19, 2017

(54) METHOD FOR RECEPTION IN COOPERATIVE TRANSMISSION ENVIRONMENT AND TERMINAL

(71) Applicant: LG ELECTRONICS INC., Seoul (KR)

(72) Inventors: Jinyup Hwang, Seoul (KR); Sangwook Lee, Seoul (KR); Manyoung Jung, Seoul (KR); Yoonoh Yang, Seoul (KR); Suhwan Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 95 days.

(21) Appl. No.: 14/758,851

(22) PCT Filed: Jan. 10, 2014

(86) PCT No.: PCT/KR2014/000289
§ 371 (c)(1),
(2) Date: Jul. 1, 2015

(87) PCT Pub. No.: WO2014/112748
PCT Pub. Date: Jul. 24, 2014

(65) Prior Publication Data
US 2015/0341132 A1  Nov. 26, 2015

Related U.S. Application Data

(60) Provisional application No. 61/753,947, filed on Jan. 18, 2013.

(51) Int. Cl.
*H04W 4/00* (2009.01)
*H04J 11/00* (2006.01)
(Continued)

(52) U.S. Cl.
CPC .......... *H04J 11/0053* (2013.01); *H04L 5/005* (2013.01); *H04L 5/0035* (2013.01);
(Continued)

(58) Field of Classification Search
USPC .......................... 370/252–312, 328–336, 324
See application file for complete search history.

(56) References Cited

U.S. PATENT DOCUMENTS 8,964,632 B2 * 2/2015 Sorrentino .......... H04L 25/0204
370/324
9,106,276 B2 * 8/2015 Sorrentino ............. H04B 7/024
(Continued)

OTHER PUBLICATIONS

Qualcomm Incorporated: "eNB frequency accuracy for CoMP", GPP TSG-RAN WG1 #70bis, R1-124446, Oct. 8-12, 2012.
(Continued)

*Primary Examiner* — Man Phan
(74) *Attorney, Agent, or Firm* — Dentons US LLP

(57) ABSTRACT

One embodiment of the present specification provides a reception method for a terminal supporting cooperative multi-point (CoMP). The reception method for the terminal may comprise the steps of: receiving a signal which indicates that a channel state indicator-reference signal (CSI-RS) port and a cell-specific reference signal (CRS) port are almost quasi co-located; and determining a frequency offset between a CRS and a demodulation-reference signal (DM-RS), which is quasi co-located with the CRS, on the basis of the signal which indicates that the CSI-RS port and the CRS port are almost quasi co-located. Herein the frequency offset between the CRS and the DM-RS may be within 50 Hz.

9 Claims, 32 Drawing Sheets

(51) Int. Cl.
  *H04W 72/04*   (2009.01)
  *H04L 5/00*   (2006.01)
  *H04L 27/26*   (2006.01)

(52) U.S. Cl.
  CPC ......... *H04L 5/0048* (2013.01); *H04L 5/0051* (2013.01); *H04L 27/2613* (2013.01); *H04L 27/2657* (2013.01); *H04W 72/042* (2013.01)

(56) References Cited

U.S. PATENT DOCUMENTS

| | | | |
|---|---|---|---|
| 9,119,209 B2* | 8/2015 | Nam | H04W 72/046 |
| 9,160,426 B2* | 10/2015 | Ko | H04B 7/024 |
| 2012/0182951 A1* | 7/2012 | Okubo | H04W 64/00 |
| | | | 370/329 |
| 2013/0279437 A1* | 10/2013 | Ng | H04W 48/16 |
| | | | 370/329 |
| 2014/0022988 A1* | 1/2014 | Davydov | H04B 7/024 |
| | | | 370/328 |
| 2014/0092827 A1* | 4/2014 | Jongren | H04L 5/0053 |
| | | | 370/329 |
| 2014/0301301 A1* | 10/2014 | Cheng | H04L 5/0048 |
| | | | 370/329 |
| 2015/0349855 A1* | 12/2015 | Sesia | H04B 7/024 |
| | | | 370/252 |
| 2015/0349940 A1* | 12/2015 | Kim | H04J 11/0053 |
| | | | 370/329 |

OTHER PUBLICATIONS

Samsung: "Further discussion on quasi co-location of CSI-RS and CRS", 3GPP-TSG-RAN WG1#71 meeting, R1-124913, Nov. 12-16, 2012.

Nokia Siemens Networks, Nokia: Signaling quasi co-location between CRS and CSI-RS, 3GPP TSG RAN WG1 Meeting #71, R1-125000, Nov. 12-16, 2012.

Renesas Mobile Europe Ltd: Quasi-colocation between CRS and CSI-RS antenna ports, 3GPP TSG-RAN WG1 Meeting #71, R1-125048, Nov. 12-16, 2012.

Qualcomm Incorporated: On the need for CSI-RS/CRS quasi-colocation signaling, 3GPP TSG-RAN WG1 #71, R1-125101, Nov. 12-16, 2012.

* cited by examiner

FIG. 11
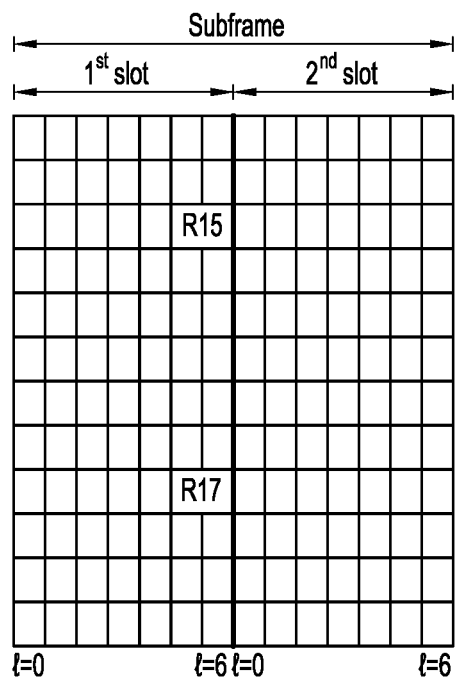
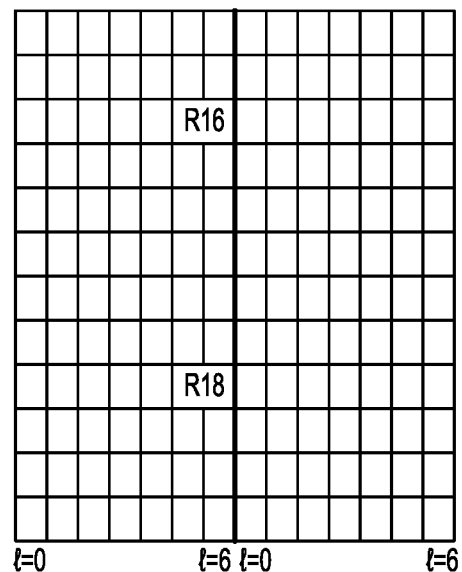
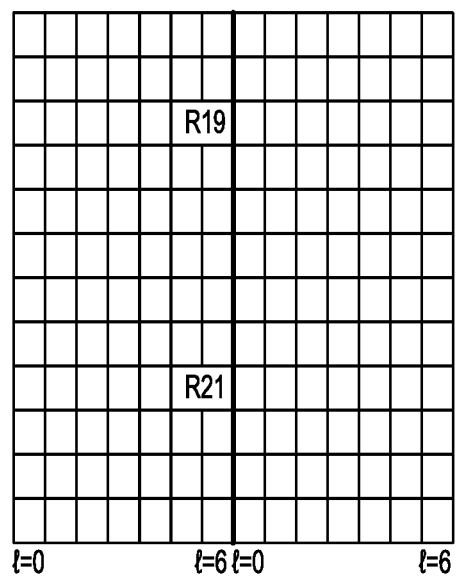
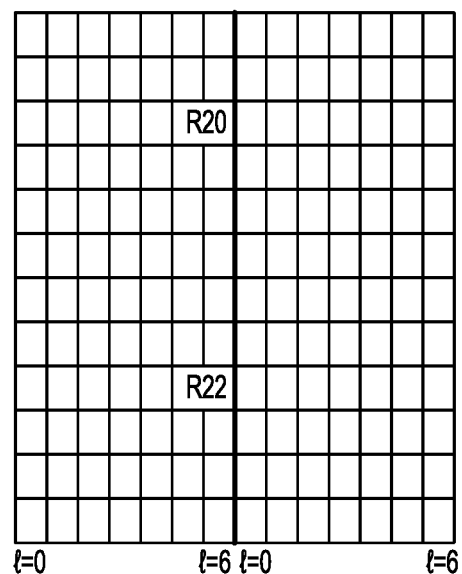

METHOD FOR RECEPTION IN COOPERATIVE TRANSMISSION ENVIRONMENT AND TERMINAL

This application is a National Phase Application of International Application No. PCT/KR2014/000289, filed on Jan. 10, 2014, which claims the benefit of U.S. Provisional Application No. 61/753,947, filed Jan. 18, 2013, which are hereby incorporated by reference in their entirety for all purposes as if fully set forth herein.

BACKGROUND OF THE INVENTION

Field of the Invention

The disclosure relates to a receiving method and terminal in a cooperative transmission environment.

Related Art

A 3rd generation partnership project (3GPP) long term evolution (LTE) that improves a universal mobile telecommunications system (UMTS) has been introduced to a 3GPP release 8. The 3GPP LTE uses an orthogonal frequency division multiple access (OFDMA) in a downlink and a single carrier-frequency division multiple access (SC-FDMA) in an uplink. The OFDM needs to know in order to understand the OFDMA. The OFDM may be used since an inter-symbol interference effect can be reduced due to low complexity. The OFDM converts data to be input in serial into N parallel data and transmits it by carrying N orthogonal sub-carriers. The sub-carriers maintains orthogonally in a frequency dimension. Meanwhile, the OFDMA means a multiple access method to realize multiple accesses by providing a part of the available sub-carrier to each user independently, in a system using the OFDM in a modulation scheme.

In recent years, there is an ongoing discussion on 3GPP LTE-advanced (LTE-A) evolved from the 3GPP LTE.

Further, future wireless communication systems may implement transmission by cooperative multi-point (CoMP) using carrier aggregation.

However, when the frequency offset between cooperative points is large, the terminal's reception capability may be decreased.

SUMMARY OF THE INVENTION

The present disclosure aims to address the above-described issues.

To achieve the above objects, the present disclosure provides receiving method performed by a user equipment (UE) supporting CoMP (Cooperative Multi-Point). The receiving method may comprise: receiving a signal indicating that a channel state indicator-reference signal (CSI-RS) port and a cell-specific reference signal (CRS) port are quasi co-located; and determining a frequency offset between the CRS and a quasi co-located demodulation-reference signal (DM-RS) based on the signal indicating that the CSI-RS port and the CRS port are quasi co-located, wherein the frequency offset between the CRS and the DM-RS is within 50 Hz.

The signal may be a radio resource control (RRC) signal.

The RRC signal may include one or more of a cell ID for the quasi co-located CRS and information on the number of CRS ports.

The determining step of the frequency offset includes: determining whether the CRS and the quasi co-located DM-RS are received from the same transmission port (TP); and unless receiving the same transmission point (TP), estimating a frequency offset between the CRS and the quasi co-located DM-RS.

The method may further comprise: compensating for the frequency offset using the CRS when the frequency offset between the CRS and the DM-RS is larger than 50 Hz.

The method may further comprise: demodulating a physical downlink shared channel (PDSCH) using the DM-RS to receive data.

To achieve the above objects, the present disclosure provides a user equipment (UE) supporting CoMP (cooperative multi-point). The UE may comprise: a radio frequency (RF) unit receiving a signal indicating that a channel state indicator-reference signal (CSI-RS) port and a cell-specific reference signal (CRS) port are quasi co-located; and a processor controlling the RF unit and determining a frequency offset between the CRS and a quasi co-located demodulation-reference signal (DM-RS) based on the signal indicating that the CSI-RS port and the CRS port are quasi co-located, wherein the frequency offset between the CRS and the DM-RS is within 50 Hz.

According to the present disclosure, a terminal's reception capability may be secured by reducing the frequency offset between cooperative transmission points in a CoMP environment.

BRIEF DESCRIPTION OF THE DRAWINGS

FIG. 11 illustrates an example of an RB to which a CSI-RS is mapped among reference signals.

DESCRIPTION OF EXEMPLARY EMBODIMENTS

Figure 1:
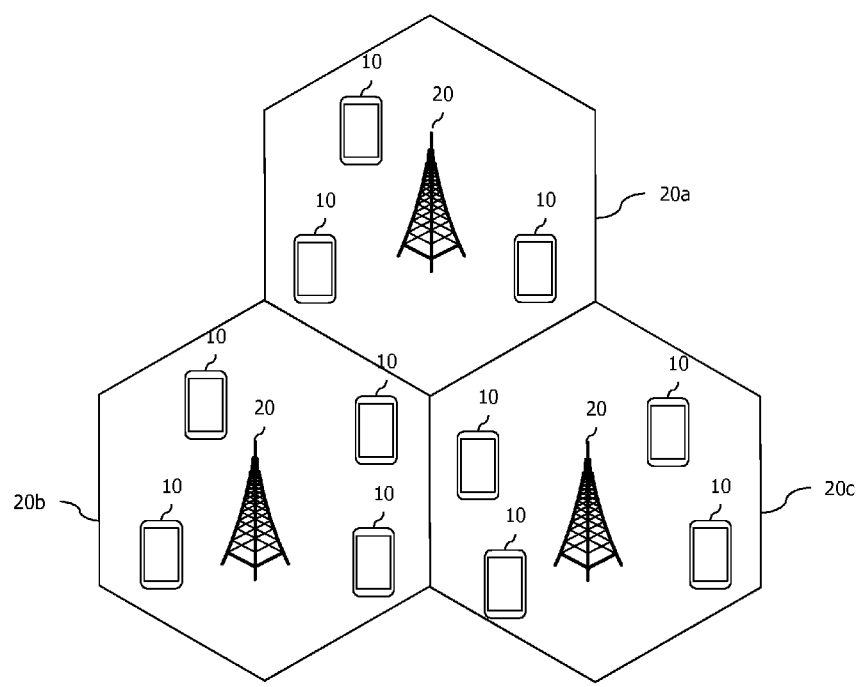
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 shows a wireless communication system.

The wireless communication system 10 includes at least one base station (BS) 20. Respective BSs 20 provide a communication service to particular geographical areas 20a, 20b, and 20c (which are generally called cells). Each cell may be divided into a plurality of areas (which are called sectors). A user equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 201 generally refers to a fixed station that communicates with the UE 10 and may be called by other names such as evolved-NodeB (eNB), base transceiver system (BTS), access point (AP), etc.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Figure 2:
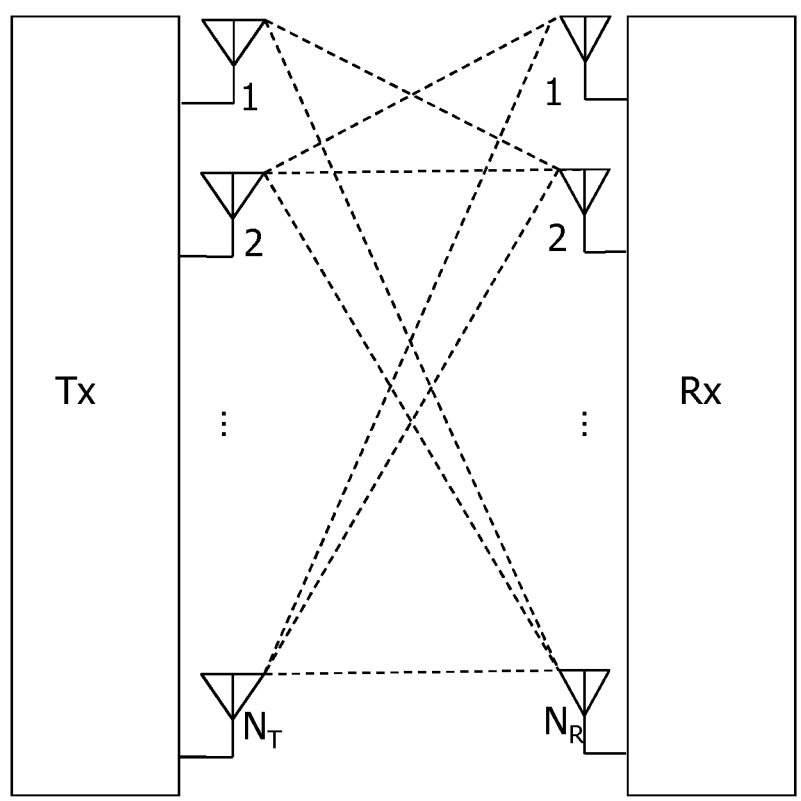
FIG. 2 is a view illustrating a configuration of an antenna in a multi-antenna system.

FIG. 2 illustrates a general multiple antenna system.

As shown in FIG. 2, when increasing the number of transmission antenna to $N_T$ and increasing the number of reception antenna to $N_R$ at the same time, a transmission rate can be increased and a frequency efficiency can be dramatically increased because a theoretical channel transmission capacity is increased in proportion to the number of antenna, unlike the case of using multiple antennas only in either one of transmitter or receiver.

The transmission rate due to the increase of channel transmission capacity may be theoretically increased by multiple of a maximum transmission rate $R_o$ in case of using an antenna and a rate increase $R_i$ as shown below.

$$R_i = \min(N_T, N_R) \quad \text{[Equation 1]}$$

The transmission information may include up to $N_T$ different pieces of information when the number of transmission antennas is $N_T$. In this case, the transmission information may be represented as in Equation 2.

$$s = [s_1, s_2, \ldots, s_{N_T}]^T \quad \text{[Equation 2]}$$

In Equation 2, s refers to a transmission information vector, and $s_1, s_2, \ldots, s_{N_T}$ represent the respective elements of transmission information vectors. Each information may be transmitted having a different transmission power. When the respective transmission powers are represented as ($P_1$, $P_2$, ..., $P_{N_T}$), a transmission information vector to which a transmission power is applied may be represented as in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Equation 3 may be represented as the product of a transmission power diagonal matrix and a transmission information vector as in Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Transmission signals ($x_1, x_2, \ldots, x_{N_T}$) that are actually transmitted through $N_T$ transmission antennas are generated by multiplying a transmission information vector $\hat{s}$ to which transmission power is applied by a weight matrix W. The weight matrix W functions to properly distribute transmission informations to individual antennas depending on transmission channel conditions. Assuming that a transmission signal vector is x, the following equation may be obtained.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, an element in the weight matrix, $w_{ij}$ ($1 \le i \le N_T$, $1 \le j \le N_T$), represents a weight for an ith transmission antenna and a jth transmission information. The weight matrix W is also denoted a precoding matrix.

A transmission signal vector may include different transmission informations depending on transmission schemes. For example, when spatial diversity, i.e., transmission diversity, applies, transmission informations of the transmission signal vectors may be all the same. That is, $[s_1, s_2, \ldots, s_{nT}]$ may be all the same information, e.g., $[s_1, s_1, \ldots, s_1]$. Accordingly, since the same transmission informations are transferred to the receiver through different channels, a diversity effect occurs, and the transmission may be more reliable.

Or, when spatial multiplexing applies, the transmission informations of the transmission signal vectors may be different. That is, $s_1, s_2, \ldots, s_{nT}$ may be all different. Since different transmission informations are transmitted to the receiver through different channels, the amount of information to be transmitted may be increased.

Of course, transmission informations may be transmitted using both spatial diversity and spatial multiplexing. That is, in the above example, the same informations may be transmitted by spatial diversity through three transmission antennas, and different informations may be transmitted through spatial multiplexing through the remaining transmission antennas. In such case, the transmission information vectors may be configured as, e.g., $[s_1, s_1, s_1, s_2, s_3, \ldots, s_{nT-2}]$.

When the receiver has $N_R$ reception antennas, a signal received by an individual reception antenna may be represented as $y_n (1 \le n \le N_R)$. In this case, a reception signal vector y may be represented as in the following equation.

$$y = [y_1, y_2, \ldots, y_{N_R}]^T \quad \text{[Equation 6]}$$

When channel modeling is performed in a MIMO system, each channel may be differentiated from another by an index of a transmission antenna and an index of a reception antenna. When the index of the transmission antenna is j, and the index of the reception antenna is i, the channel between the transmission antenna and the reception antenna may be represented as $h_{ij}$. (it should be noted that the index of the reception antenna comes before the index of the transmission antenna in the subscript indicating the channel).

Figure 3:
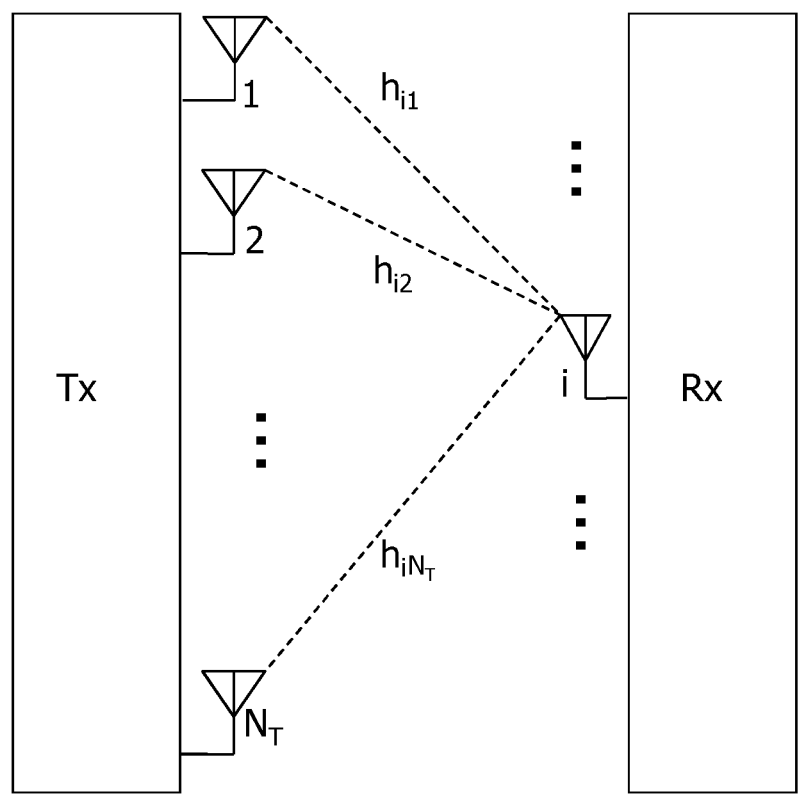
FIG. 3 illustrates an example of a channel in a multi-antenna system.

FIG. 3 illustrates an example of a channel in a multi-antenna system.

Referring to FIG. 3, channels for $N_T$ transmission antennas and reception antenna I are represented as $h_{i1}$, $h_{i2}, \ldots, h_{iN_T}$. For convenience, such channels may be represented in a matrix or vector. Then, the channels $h_{i1}$, $h_{i2}$, $h_{iN_T}$, may be represented in a vector form as follows.

$$h_i^T = [h_{i1}, h_{i2}, \ldots, h_{iN_T}] \quad \text{[Equation 7]}$$

When a matrix representing all the channels to $N_R$ in $N_T$ transmission antennas is channel matrix H, H may be represented as in Equation 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

A signal transmitted through a transmission antenna passes through a channel as represented in Equation 8 and is then received by a reception antenna. In this case, the actual channel adds noise. The noise may be mathematically deemed an AWGN (Additive White Gaussian Noise). When AWGNs added to the reception antennas, respectively, are represented as $n_1, n_2, \ldots, n_{NR}$, the AWGNs may be represented as a vector as in the following equation.

$$n = [n_1, n_2, \ldots, n_{N_R}]^T \quad \text{[Equation 9]}$$

A reception signal vector y received by a reception antenna considering the above-described AWGN, transmission signal vector x, and channel matrix may be represented as in the following equation.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The numbers of rows and columns in the channel matrix H are determined depending on the numbers of transmission antennas and reception antennas. The number of rows in the channel matrix H is the same as the number of reception antennas. The number of columns in the channel matrix H is the same as the number of transmission antennas. Accordingly, the channel matrix H may be represented as a $N_R \times N_T$ matrix.

Generally, a rank of a matrix is defined by the smaller of the number of independent rows and the number of independent columns. Accordingly, the rank of matrix cannot be larger than the number of rows or the number of columns, and the rank of channel matrix H is determined as in the following equation.

$$\text{rank}(H) \leq \min(N_T, N_R) \quad \text{[Equation 11]}$$

Meanwhile, a wireless communication system may be divided into a frequency division duplex (FDD) method and a time division duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 4:
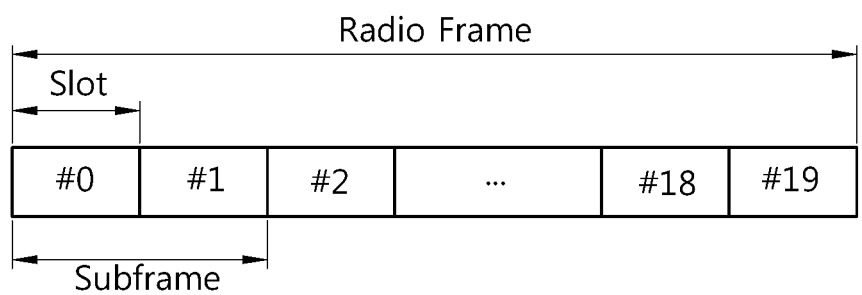
FIG. 4 illustrates a structure of a radio frame according to FDD in 3GPP LTE.

FIG. 4 illustrates the architecture of a radio frame according to FDD in 3GPP LTE.

Referring to FIG. 4, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1ms, and the length of one slot may be 0.5 ms.

The structure of the radio frame is merely an example, and the number of subframes included in the radio frame, the number of slots included in the subframe, etc. may be variously modified.

Figure 5:
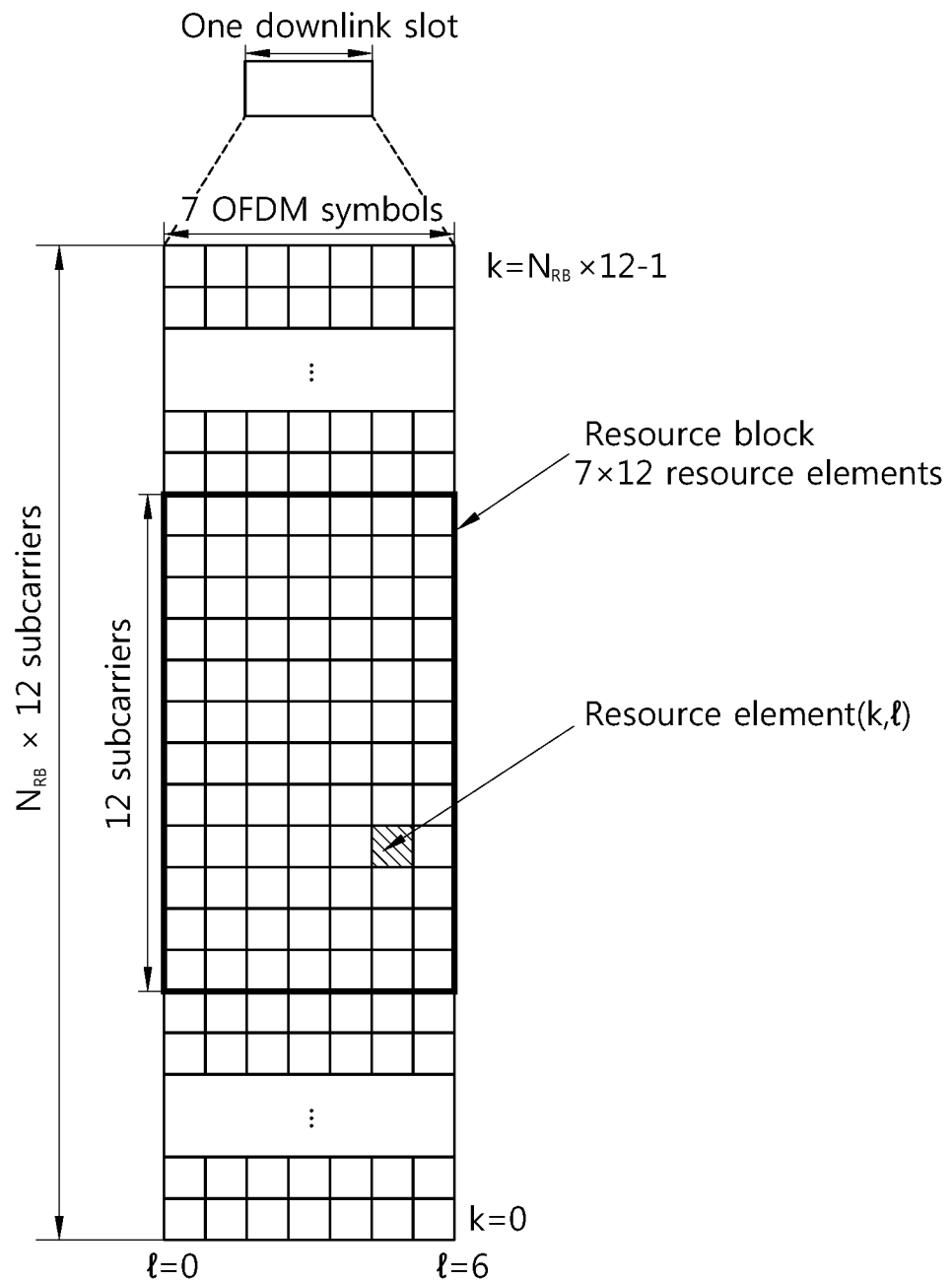
FIG. 5 is a view illustrating an exemplary resource grid for one uplink or downlink slot in 3GPP LTE.

FIG. 5 illustrates an example resource grid for one uplink or downlink slot in 3GPP LTE.

Referring to FIG. 5, the uplink slot includes a plurality of OFDM (orthogonal frequency division multiplexing) symbols in the time domain and NUL resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 4 may also apply to the resource grid for the downlink slot.

Figure 6:
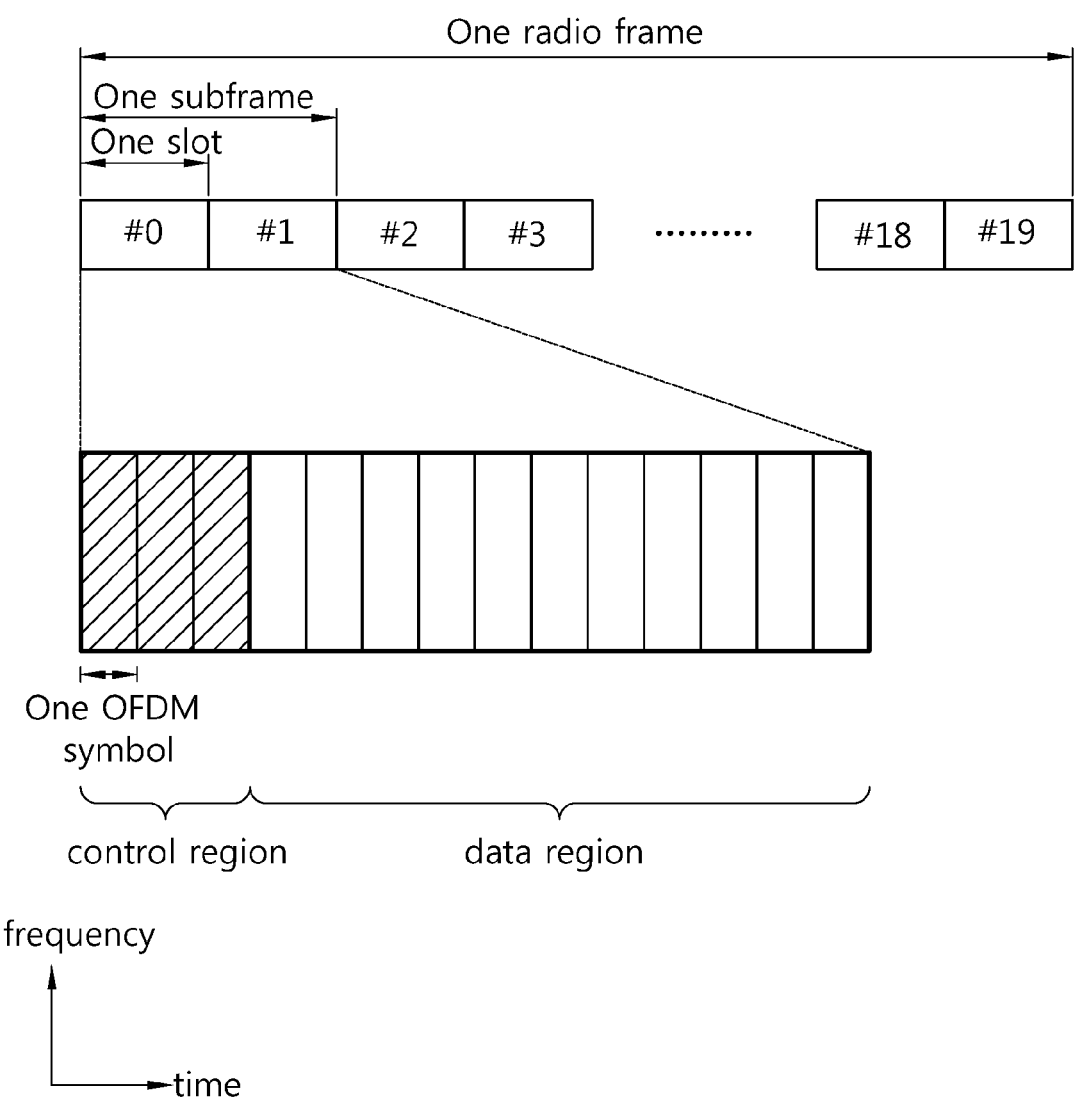
FIG. 6 illustrates the structure of a downlink sub-frame.

FIG. 6 illustrates the architecture of a downlink subframe.

For this, 3GPP TS 36.211 V10.4.0 (2011-December) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 7:
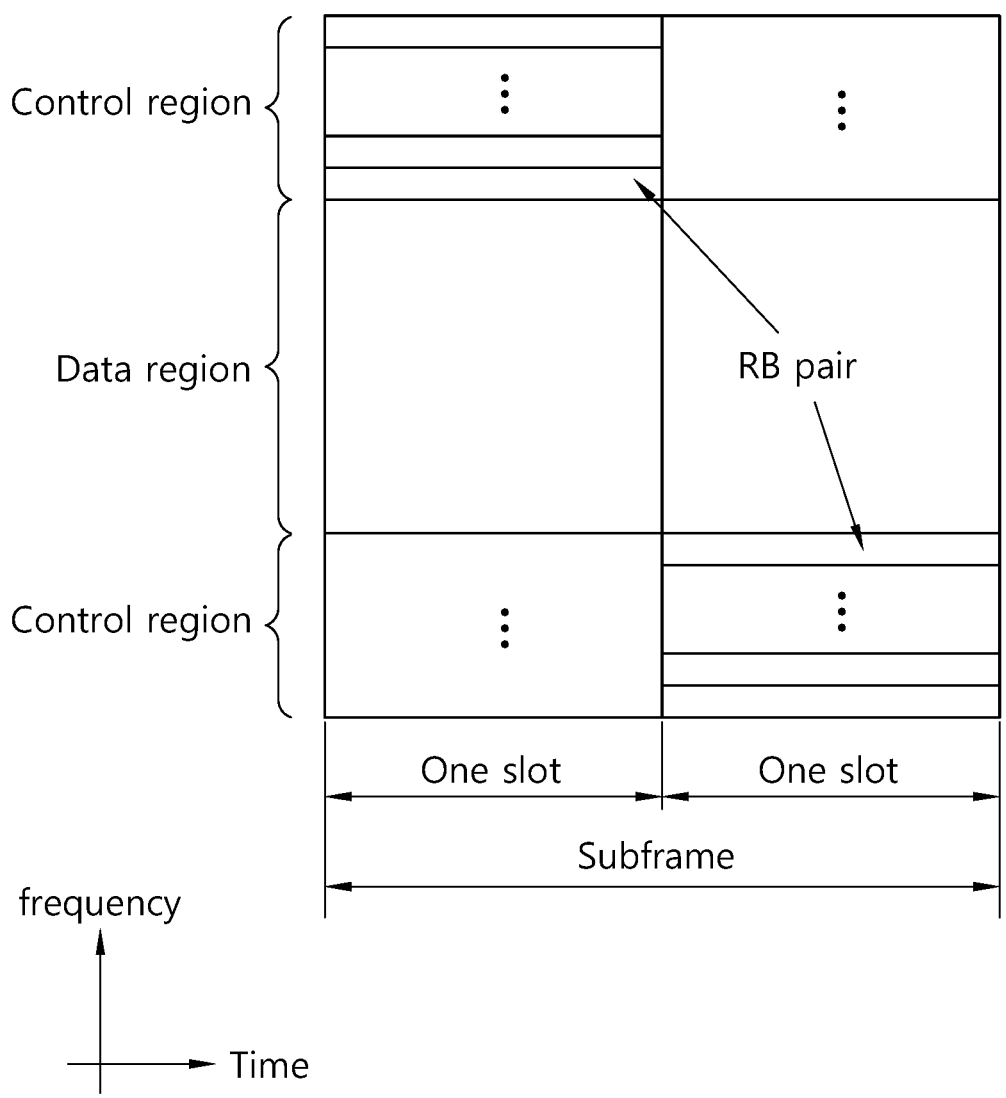
FIG. 7 illustrates the structure of an uplink sub-frame in 3GPP LTE.

FIG. 7 illustrates the architecture of an uplink sub-frame in 3GPP LTE.

Referring to FIG. 7, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

Figure 8:
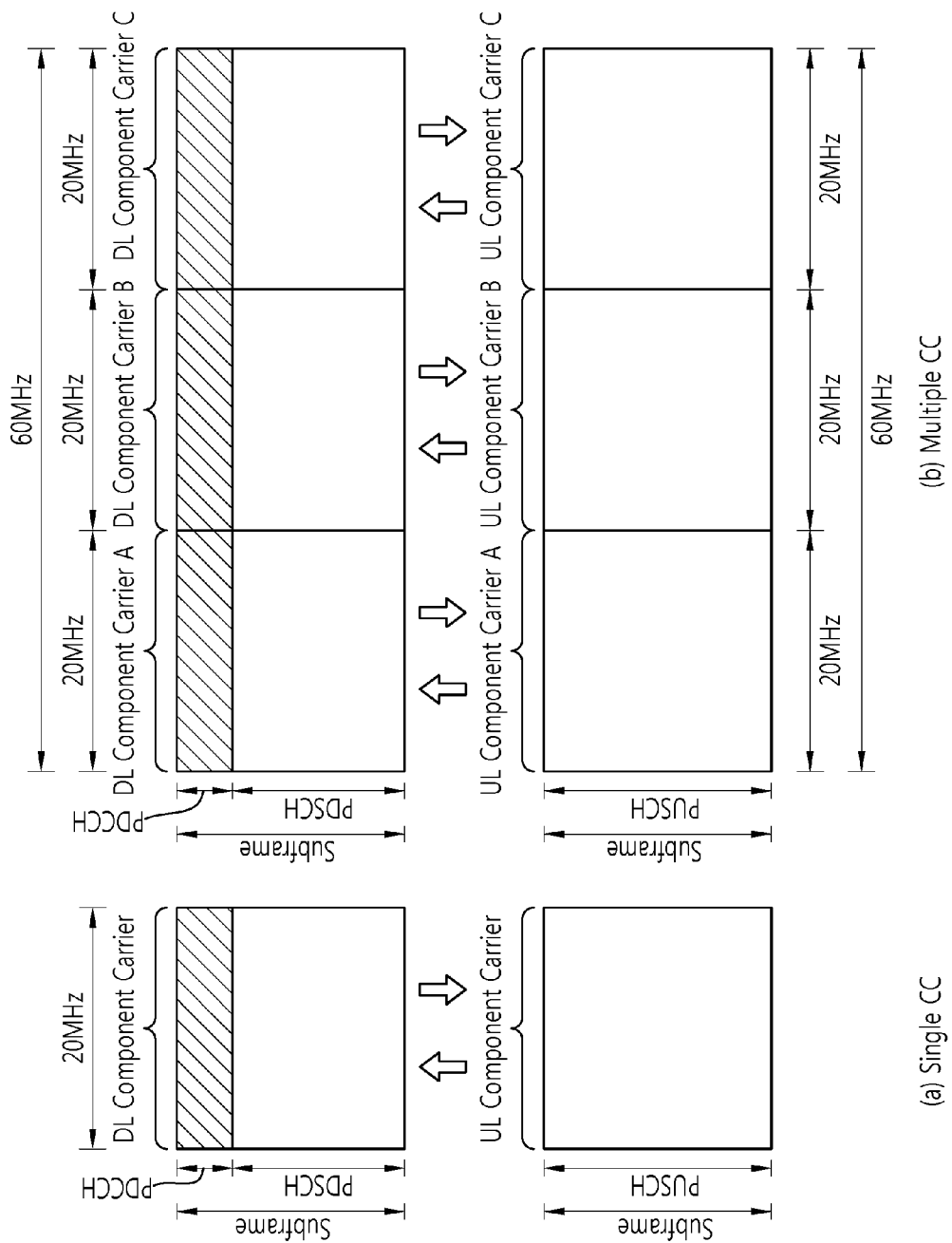
FIG. 8 illustrates an example of comparing a conventional single carrier system and a carrier aggregation system.

FIGS. 8a and 8b illustrate an example of comparison between a single carrier system and a carrier aggregation system.

Referring to FIG. 8a, a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 7 primarily focuses on the FDD scheme for ease of description, the foregoing may be applicable to the TDD scheme by separating the radio frame for uplink/downlink in the time domain.

As shown in FIG. 8a, data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 8b may correspond to a communication example in an LTE-A system.

Referring to FIG. 8b, in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 8b illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz(UL CC0)+20 MHz(UL CC1)+20 MHz(UL CC2)+20 MHz(UL CC3)+5 MHz(UL CC4), for example. However, without consideration of backward compatibility, a new bandwidth may be defined rather the existing system bandwidth being used, to constitute a broadband.

FIG. 8b illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Meanwhile, the reference signal is hereinafter described.

Generally, transmission information, e.g., data, may be prone to be distorted or varied while transmitted through a wireless channel. Accordingly, a reference signal is required to demodulate the transmission information without errors. The reference signal is a signal previously known between the transmitter and the receiver and is transmitted together with transmission information. Since transmission information transmitted from the transmitter goes through a channel corresponding to each transmission antenna or layer, the reference signal may be allocated per transmission antenna or layer. The reference signal per transmission antenna or layer may be differentiated using resources, such as time, frequency, or code. The reference signal may be used for two purposes, i.e., demodulation and channel estimation of transmission information.

There may be two types of reference signals depending on the category of a receiver previously aware of a reference signal. The first reference signal is a reference signal that is known to only a particular receiver (e.g., a particular UE) and such reference signal is denoted a dedicated RS (DRS). The dedicated reference signal, in such meaning, is also referred to as a UE-specific RS. The second reference signal is a reference signal that is known to all the receivers in a cell, e.g., all the UEs, and such reference signal is denoted a common RS (CRS). The CRS is also denoted a cell-specific RS.

Further, reference signals may be classified depending on uses. For example, a reference signal used for data demodulation is denoted a demodulation RS (DM-RS). A reference signal used for feedback information indicating a channel state, such as CQI/PMI/RI, is denoted a CSI-RS (channel state indicator-RS). The DRS may be used as a DM-RS. It is hereinafter assumed that the DM-RS is a DRS.

Figure 9:
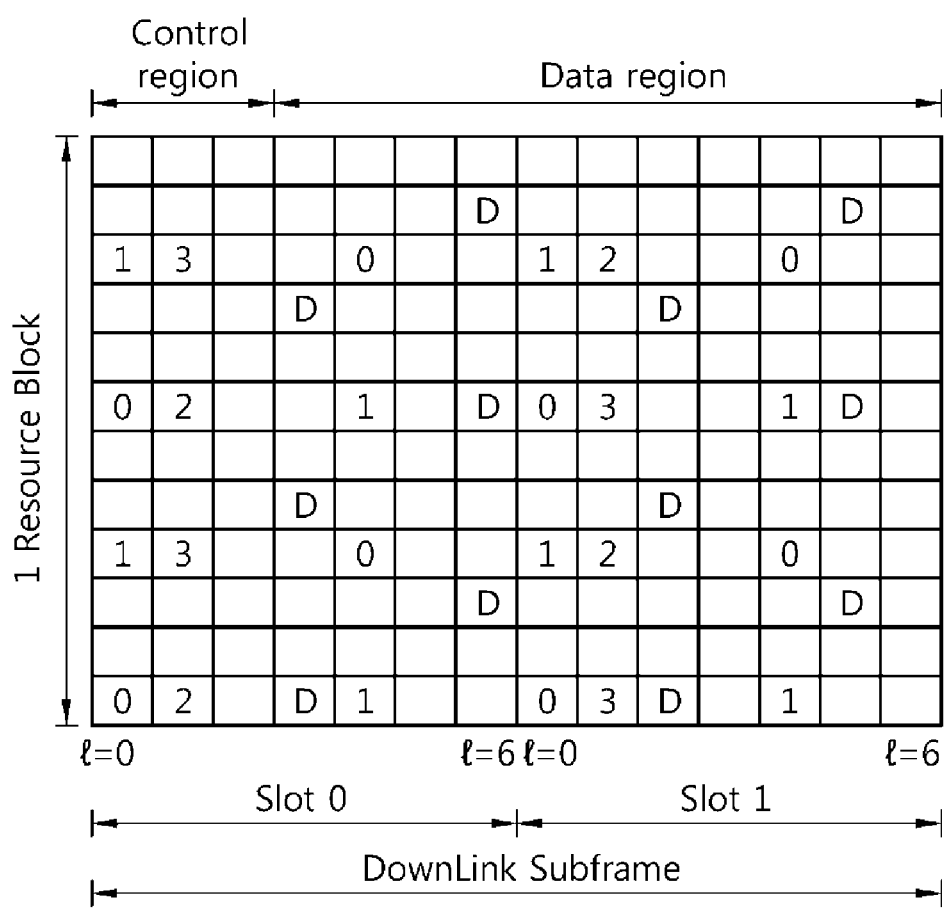
FIG. 9 illustrates an example of an RS structure that may support four antenna ports in normal CP.
Figure 10:
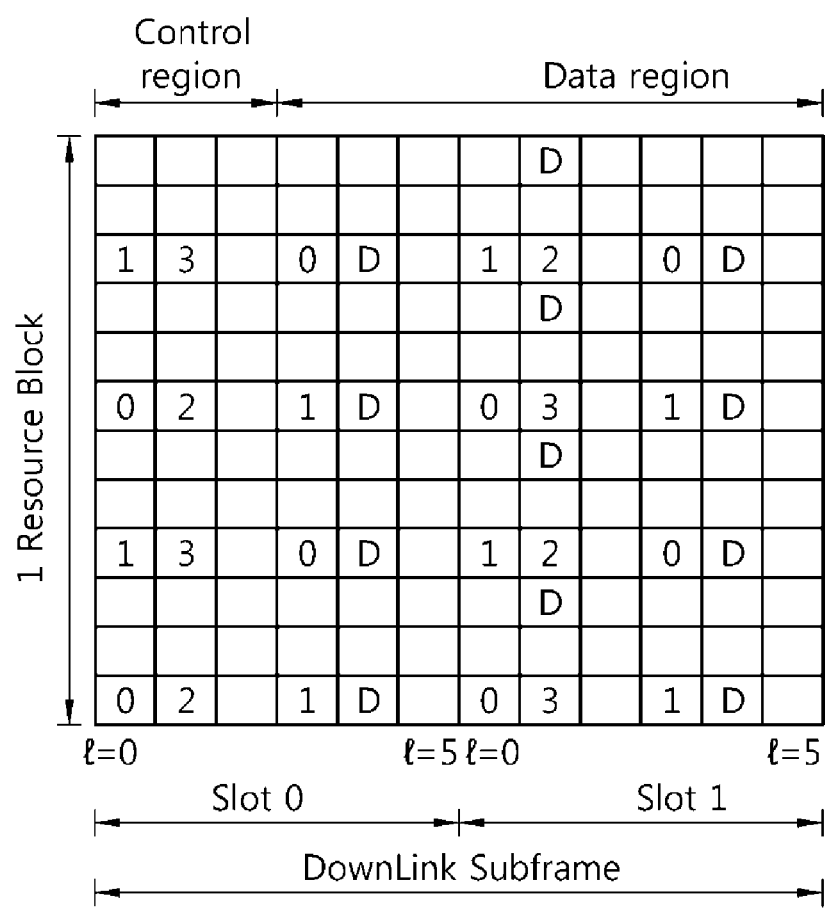
FIG. 10 illustrates an example of an RS structure that may support four antenna ports in extended CP.

FIG. 9 illustrates an example of an RS structure that may support four antenna ports in normal CP. FIG. 10 illustrates an example of an RS structure that may support four antenna ports in extended CP.

The RS structures of FIGS. 9 and 10 are RS structures used in a conventional 3GPP LTE system.

The resource element marked with one of 0 to 3 in FIGS. 9 and 10 denotes a resource element where a cell-specific reference signal, i.e., a common reference signal (CRS) is transmitted. Here, any one of 0 to 3 denotes a supported antenna port. That is, resource elements marked with p (p is any one of 0 to 3) mean resource elements to which a common reference signal for antenna port p is mapped. Such common reference signal is used to perform channel measurement and data demodulation on each antenna port. The common reference signal is transmitted in both the control region and the data region.

Resource elements marked with D in FIGS. 9 and 10 denote resource elements to which a UE-specific reference signal, i.e., a dedicated reference signal (DRS) is mapped. The UE-specific reference signal may be used single antenna port transmission of a PDSCH. The UE receives an indication as to whether a UE-specific reference signal is transmitted, and when a PDSCH is transmitted, whether the UE-specific reference signal is valid, through a higher layer signal. The UE-specific reference signal may be transmitted only when data demodulation is needed. The UE-specific reference signal may be transmitted only in the data region.

FIG. 11 illustrates an example of an RB to wich a CSI-RS is mapped among reference signals.

A CSI-RS is used for channel measurement for generation of channel information and channel estimation on a PDSCH of an LTE-A UE. CSI-RSs are relatively sparsely arranged in the frequency region or time region, and may be punctured in the data region of a normal sub-frame or MBSFN sub-frame. When necessary through CSI estimation, CQI, PMI, and RI may be reported from the UE.

CSI-RSs are transmitted through one, two, four, or eight antenna ports. The antenna ports used here are p=15, p=15, 16, p=15, ..., 18 and p=15, ..., 22, respectively. That is, CSI-RSs may be transmitted through one, two, four, and eight antenna ports. See 3GPP (3rd Generation Partnership Project) TS 36.211 V10.1.0 (2011-March) "Technical Specification Group Radio Access Network; Evolved Universal Terrestrial Radio Access (E-UTRA); Physical channels and modulation (Release 8)," Ch. 6.10.5 for the CSI-RS.

In transmission of a CSI-RS, up to 32 different configurations may be proposed to reduce inter-cell interference (ICI) in a multi-cell environment including a heterogeneous network (HetNet) environment. The configuration of the CSI-RS may be varied depending on the number of antenna ports in the cell and CP, and a neighboring cell may have a configuration as different as possible. Further, CSI-RS configurations may be divided depending on the frame structure into ones applied to both the FDD frame and TDD frame and ones applied only to the TDD frame. A plurality of CSI-RS configurations in one cell may be used. Zero or one CSI-RS configuration for UEs assuming non-zero power CSI-RSs and 0 or several CSI-RS configurations for UEs assuming zero power CSI-RSs may come in use.

The CSI-RS configurations may be indicated by a higher layer. For example, a CSI-RS-Config IE (information element) transmitted through a higher layer may indicate a CSI-RS configuration. Table 1 shows an example of CSI-RS-Config IE.

TABLE 1

```
CSI-RS-Config-r10 ::=       SEQUENCE {
            csi-RS-r10      CHOICE {
                release         NULL,
                setup           SEQUENCE {
                    antennaPortsCount-r10       ENUMERATED {an1, an2, an4, an8},
                    resourceConfig-r10          INTEGER (0..31),
                    subframeConfig-r10          INTEGER (0..154),
                    p-C-r10                     INTEGER (-8..15)
                }
            }                                   OPTIONAL,       -- Need ON
            zeroTxPowerCSI-RS-r10   CHOICE {
                release         NULL,
                setup           SEQUENCE {
                    zeroTxPowerResourceConfigList-r10   BIT STRING (SIZE (16)),
                    zeroTxPowerSubframeConfig-r10       INTEGER (0..154)
                }
            }                                   OPTIONAL,       -- Need ON
}
-- ASN1STOP
```

Referring to Table 1, the 'antennaPortsCount' field indicates the number of antenna ports used for transmission of a CSI-RS. The 'resourceConfig' field indicates a CSI-RS configuration. The 'SubframeConfig' field and 'zeroTxPowerSubframeConfig' field indicate sub-frame configurations where a CSI-RS is transmitted.

The 'zeroTxPowerResourceConfigList' field indicates a zero-power CSI-RS configuration. The CSI-RS configurations corresponding to bits set to 1's in the bitmap of 16 bits constituting the 'zeroTxPowerResourceConfigList' field may be set as zero-power CSI-RSs.

A sequence $r_{l,n_s}(m)$ for CSI-RS may be generated as in the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, \ldots, N_{RB}^{max,DL} - 1$$

[Equation 12]

where, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In Equation 12, $n_s$ is a slot number in the radio frame, and l is an OFDM symbol number in the slot. c(i) is a pseudo random sequence and is started at each OFDM symbol with $c_{init}$ indicated in Equation 1. $N_{ID}^{cell}$ means a physical cell ID.

In sub-frames configured to transmit CSI-RSs, the reference signal sequence $r_{l,n_s}(m)$ is mapped to a complex value modulation symbol $a_{k,l}^{(p)}$ used as a reference symbol for antenna port p.

The relationship between $r_{l,n_s}(m)$ and $a_{k,l}^{(p)}$ is given as in the following equation.

$$a_{k,l}^{(p)} = w_{l''} \cdot r(m)$$

[Equation 13]

where, $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & CSI \text{ reference signal configurations } 0\text{-}19, \text{ normal cyclic prefix} \\ 2l'' & CSI \text{ reference signal configurations } 20\text{-}31, \text{ normal cyclic prefix} \\ l'' & CSI \text{ reference signal configurations } 0\text{-}27, \text{ normal cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 13, (k', l') and $n_s$ are given in Tables 2 and 3 described below. A CSI-RS may be transmitted in a downlink slot where ($n_s$ mod 2) meets the conditions in Tables 2 and 3 to be described below (where, 'mod' means modular computation. That is, ($n_s$ mod 2) means the remainder obtained by dividing $n_s$ by 2).

Table 2 represents a CSI-RS configuration in normal CP, and Table 3 represents a CSI-RS configuration in extended CP.

TABLE 2

| | | Number of configured CSI-RSs | | | | | |
|---|---|---|---|---|---|---|---|
| | | 1 or 2 | | 4 | | 8 | |
| | CSI-RS configuration index | (k', l') | $n_s$ mod 2 | (k', l') | $n_s$ mod 2 | (k', l') | $n_s$ mod 2 |
| TDD and FDD frames | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |

TABLE 2-continued

| | | Number of configured CSI-RSs | | | | |
|---|---|---|---|---|---|---|
| | | 1 or 2 | | 4 | | 8 |
| | CSI-RS configuration index | $(k', l')$ | $n_s$ mod 2 | $(k', l')$ | $n_s$ mod 2 | $(k', l')$ | $n_s$ mod 2 |
| TDD frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| | | Number of configured CSI-RSs | | | | |
|---|---|---|---|---|---|---|
| | | 1 or 2 | | 4 | | 8 |
| | CSI-RS configuration index | $(k', l')$ | $n_s$ mod 2 | $(k', l')$ | $n_s$ mod 2 | $(k', l')$ | $n_s$ mod 2 |
| TDD and FDD frames | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| TDD frame | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

The UE may transmit CSI-RSs only in the downlink slot meeting the condition of ns mod 2 in Tables 2 and 3. Further, the UE abstains from transmitting CSI-RSs in a special sub-frame of a TDD frame, a sub-frame where CSI-RS transmission collides with a synchronization signal, PBCH (physical broadcast channel), and system information block type 1 (SystemInformationBlockType1) or a sub-frame where a paging message is transmitted. Further, in a set S, where S={15}, S={15, 16}, S={17, 18}, S={19, 20} or S={21, 22}, a resource element where a CSI-RS of one antenna port is transmitted is not used for transmission of a CSI-RS of another antenna port.

Table 4 shows an example of a configuration of a sub-frame where a CSI-RS is transmitted.

TABLE 4

| CSI-RS-SubframeConfig $I_{CSI-RS}$ | CSI-RS period $T_{CSI-RS}$ (sub-frame) | CSI-RS sub-frame offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 4, depending on the CSI-RS sub-frame configuration ($I_{CSI-RS}$), the period ($T_{CSI-RS}$) of the sub-frame where CSI-RSs are transmitted and an offset ($\Delta_{CSI-RS}$) may be determined. The CSI-RS sub-frame configuration in Table 4 may be one of the 'SubframeConfig' field or 'ZeroTxPowerSubframeConfig' field of the CSI-RS-Config IE in Table 1. The CSI-RS sub-frame configuration may be separately made for non-zero power CSI-RSs and zero power CSI-RSs.

Meanwhile, FIG. 11 illustrates resource elements used for CSI-RSs when the CSI-RS configuration index is 0 in normal CP. Rp denotes a resource element used for CSI-RS transmission on antenna port p. Referring to FIG. 11, CSI-RSs for antenna ports 15 and 16 are transmitted through the resource elements corresponding to the third subcarriers (subcarrier index 2) of the sixth and seventh OFDM symbols (OFDM symbol indexes 5 and 6) of the first slot. The CSI-RSs for antenna ports 17 and 18 are transmitted through resource elements corresponding to the ninth subcarriers (subcarrier index 8) of the sixth and seventh OFDM symbols (OFDM symbol indexes 5 and 6) of the first slot. The CSI-RSs for antenna ports 19 and 20 are transmitted through the same resource element where the CSI-RSs for antenna ports 15 and 16 are transmitted, and the CSI-RS s for antenna ports 21 and 22 are transmitted through the same resource element where the CSI-RSs for antenna ports 17 and 18 are transmitted.

When CSI-RSs are transmitted to the UE through eight antenna ports, the UE will receive RBs to which R15 to R22 are mapped. That is, the UE will receive a CSI-RS having a particular pattern.

Meanwhile, inter-cell interference issues and their solutions are hereinafter described.

A most fundamental method for addressing inter-cell interference issues is to use different frequencies for heterogeneous networks. However, since the frequency is a rare and expensive resource, the frequency division solution is not welcomed by business providers.

Accordingly, the 3GPP attempted to address the inter-cell interference issue through time division.

As an effort, the 3GPP is conducting vigorous research on eICIC (enhanced inter-cell interference coordination) as an interference cooperative method.

The time division scheme adopted by LTE Release-10 is called enhanced ICIC (Enhanced inter-cell interference Coordination) from a point of view that it has been further evolved than the conventional frequency division scheme. An interfering cell is defined as an aggressor cell or primary cell, and an interfered cell is defined as a victim cell or secondary cell. By this approach, the aggressor cell or primary cell stops data transmission in a particular sub-frame to allow the UE to maintain the link with the victim cell or secondary cell in the sub-frame. That is, this method enables one of co-existent heterogeneous cells to stop transmitting signals to a UE severely interfered in a region to send few interference signals.

Meanwhile, the particular sub-frame where data transmission is stopped is called an ABS (Almost Blank Sub-frame), and any other data than necessary control information is transmitted in the sub-frame corresponding to the ABS. The necessary control information is, e.g., a CRS (Cell-specific Reference Signal). As per the current 3GPP LTE/LTE-A standards, the CRS signal is present on time axis in the $0^{th}$, $4^{th}$, $7^{th}$, and $11^{th}$ OFDM symbols in each sub-frame. Accordingly, only CRS signals are transmitted on the $0^{th}$, $4^{th}$, $7^{th}$, and $11^{th}$ OFDM symbols in the sub-frame where the ABA applies.

Figure 12A:
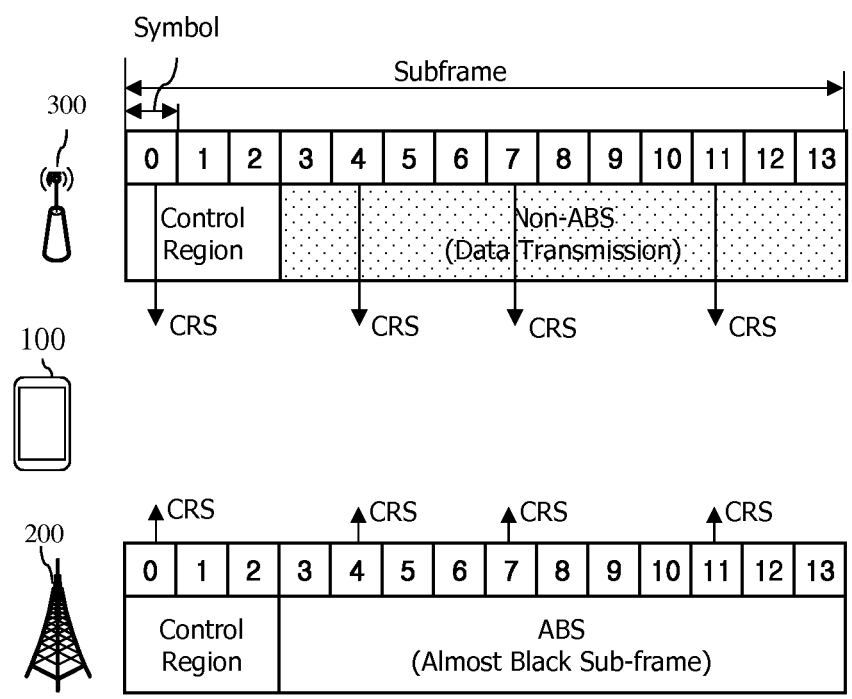
FIG. 12a is a view illustrating eICIC (enhanced Inter-Cell Interference Coordination) for solving inter-eNB interference.

FIG. 12a is a view illustrating eICIC (enhanced Inter-Cell Interference Coordination) for addressing inter-eNB interference.

Referring to FIG. 12a, the first eNodeB 200a performs data transmission in the data region of the shown sub-frame. CRSs are transmitted on the $0^{th}$, $4^{th}$, $7^{th}$, and $11^{th}$ symbols.

In this case, the eNodeB 200b operates the shown sub-frame as an ABS.

That is, when the eICIC applies to the second eNodeB 200b, the sub-frame is operated as per the ABS, and no data may be transmitted in the data region. However, CRSs only may be transmitted on the $0^{th}$, $4^{th}$, $7^{th}$, and $11^{th}$ symbols in the sub-frame operated as the ABS.

Figure 12B:
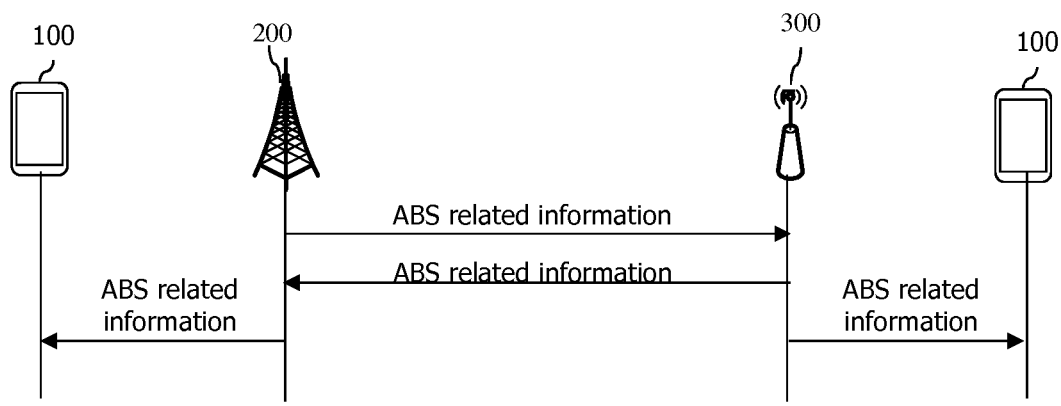
FIG. 12b illustrates an example of exchanging ABS subframe-related information.

FIG. 12b illustrates an example of exchanging ABS subframe-related information.

As can be seen from FIG. 12b, ABS-related information may be exchanged between the first eNodeB 200a and the second eNodeB 200b through an X2 interface.

Further, the first eNodeB 200a and the second eNodeB 200b may deliver the ABS-related information to their serving UEs 100a and 100b.

The first eNodeB 200a and the second eNodeB 200b may configure measurement subsets for their serving UEs 100a and 100b based on one or more of their ABS-related information and opposite party's ABS-related information and may transfer them.

Since the cells 200a and 200b do not perform downlink signal transmission on the downlink sub-frames configured as ABSs or transmit downlink signals with reduced power, the interference with the coverage of another cell may be reduced as compared with a downlink sub-frame that is not configured as an ABS. As such, the magnitude of interference may be varied depending on whether the sub-frame has been configured as an ABS, and thus, the UE 100 performs measurement only on a particular predesignated sub-frame.

To that end, each cell 200a and 200b may instruct its serving UE 100a and 100b to perform measurement only on a particular sub-frame based on one or more of its ABS pattern information and opposite party's ABS pattern information. This is called restricted measurement. The instruction may be delivered through a higher layer signal. The higher layer signal may be an RRC signal. The signal may be a CQI-ReportConfig element.

The ABS-related information includes ABS information and an ABA state.

First, the ABS information may include one or more of the information elements shown in the following table, for example. The ABS pattern information is information indicating a sub-frame to be used as an ABS in a bitmap. The ABS pattern information may include a bitmap of 40 bits in FDD and a bitmap of up to 70 bits in TDD. For FDD as an example, 40 bits indicate 40 sub-frames. If the bit value is 1, it indicates an ABS, and if the bit value is 0, it indicates a non-ABS normal sub-frame. The measurement subset is a subset of the ABS pattern information. The measurement subset incudes a bitmap of 40 bits for FDD and a bitmap for up to 70 bits for TDD. The measurement subset is for configuring measurement restricted to a corresponding UE.

TABLE 5

| Information element | Description |
| --- | --- |
| ABS pattern information | The value, 1, at each position of the bitmap indicates an ABS, and the value, 0, indicates a non-ABS. The first position in the ABS pattern corresponds to sub-frame 0 in the radio frame that is SFN=. The ABS pattern is consecutively shown up in all radio frames. The maximum number of the sub-frames is 40. |
| Measurement subset | Indicates a subset of ABS pattern information and is used to configure a particular measurement for the UE. |
| ABS deactivation | Indicates that interference adjustment by ABS is not activated. |

Next, the ABS state is used to enable determination as to whether a corresponding cell should change ABS patterns. Available ABA pattern information is a subset of ABS pattern information and is constituted of a bitmap. The available ABS pattern information indicates whether a designated sub-frame has been properly used for the purpose of mitigating interference. The downlink ABS state is a ratio of the number of downlink resource blocks (RBs) scheduled in the sub-frame designated in the available ABS pattern information to then number of resource blocks (RBs) allocated for the UE that should be protected through the ABS, and the downlink ABS state indicates information as to how efficient the ABS has been utilized to fit its original purpose in the victim cell.

TABLE 6

| Information element | Description |
| --- | --- |
| Downlink ABS state | A percentage of ABS resources used. The numerator of the percentage includes resource blocks in the ABS indicated in the available ABS pattern information, and the denominator is the total number of resource blocks in the ABS indicated in the available ABS pattern information. |
| Availability of ABS pattern information | Each position in the bitmap indicates a sub-frame, and the value "1" indicates an ABS designated as protected from inter-cell interference. The value "0" is used for all other sub-frames. The pattern represented by the bitmap includes a subset of corresponding ABS pattern information or is constituted identically. |

The measurement subset constituted as a subset of the ABS pattern information is a sub-frame used as an ABS. The other sub-frames included in the ABS pattern may determine whether the corresponding cell may be freely utilized as ABS depending on traffic load.

On the other hand, cooperative multi-point transmission/reception CoMP is described.

In future wireless communication systems, CoMP may be implemented using carrier aggregation.

CoMP means an inter-node cooperative communication scheme. In multi-cell multi-distributive node systems, inter-cell interference may be reduced using CoMP. In single cell multi-distributive node systems, inter-cell inter-point interference may be reduced. Use of CoMP enables the UE to be jointly supported by multiple nodes. When CoMP is used, each eNodeB may simultaneously support one or more UEs using the same radio frequency resource to improve system performance. Further, when CoMP is used, the eNodeB may perform a space division multiple access (SDMA) method based on information on the channel state between the eNodeB and the UE.

A major purpose of CoMP is to enhance communication performance of UEs at a cell boundary or node boundary.

Figure 13:
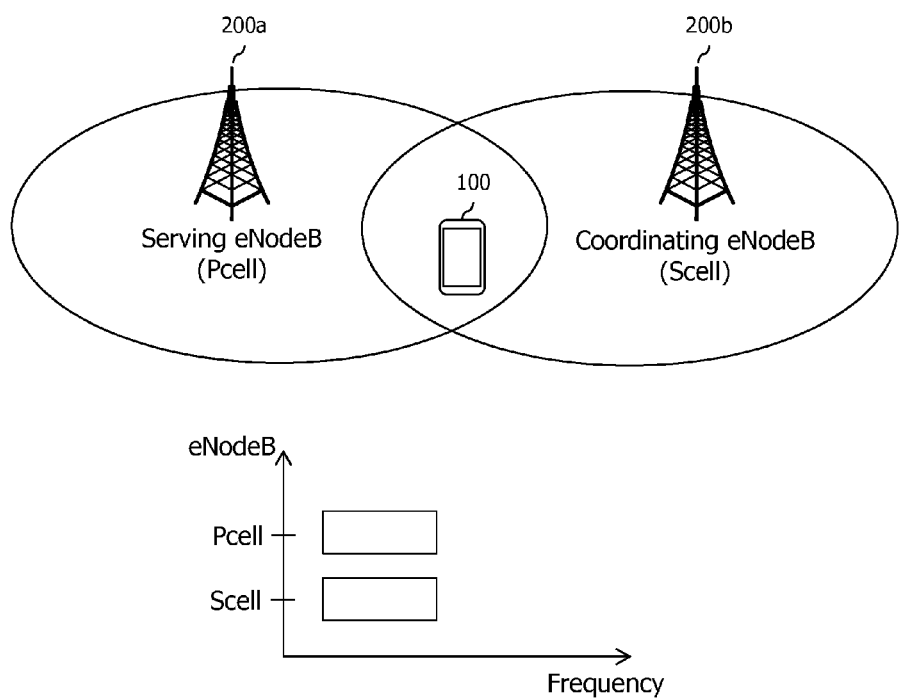
FIG. 13 illustrates an example a CoMP system using carrier aggregation.

FIG. 13 illustrates an example of a CoMP system using carrier aggregation.

Referring to FIG. 13, the CoMP system may include a serving eNB and a coordinating eNB geographically spaced from each other. The frequency used by the serving eNB may be denoted a primary cell (Pcell) carrier, and the frequency used by the coordinating eNB may be denoted a secondary cell (Scell) carrier. In this case, the primary cell carrier and the secondary cell carrier may use the same frequency band.

The serving eNB and the coordinating eNB may perform various known DL/UL CoMP operations, such as JT (joint transmission), CS (coordinated scheduling)/CB (coordinated beamforming), and dynamic cell selection.

FIG. 13 illustrates an example in which two eNBs (or two sectors of one eNB) for one UE are aggregated into a CoMP Pcell and a CoMP Scell, respectively. Without limited to the example, three or more cells for one UE may be aggregated, some cells of which conduct a CoMP operation in the same frequency band while the remaining cells conduct a simple CA operation in another frequency band. In this case, the Pcell might not necessarily attend the CoMP operation. Further, the CoMP operation is typically performed in the same frequency band, but for dynamic cell selection, a CoMP operation may be done between different frequency bands of different eNBs.

The Pcell may be a special one of serving cells carrier aggregated, and the Pcell may be a cell to which the UE has firstly linked. Further, the Pcell is a cell where the UE receives physical channels for obtaining major system information such as PBCH or PDCCH in the common search space, through a downlink, and the Pcell may transmit a PUCCH carrying, e.g., ACK/NACK or CSI, through an uplink of the Pcell. The Scell refers to a cell that is not a Pcell among the cells carrier-aggregated by the UE. This has been described above in connection with carrier aggregation.

CoMP Pcell: a special one of the cells belonging to a CoMP set is denoted a CoMP Pcell. The CoMP Pcell may be the same as the Pcell. Or, the CoMP Pcell may be set as a cell other than a Pcell through RRC signaling.

The CoMP Pcell, when cross carrier scheduling applies in the CoMP set, may be a cell that transmits a PDCCH scheduling PDSCH/PUSCH transmission for CoMP cells.

CoMP Scell denotes a cell that is not a CoMP PCell among CoMP cells.

Figure 14A:
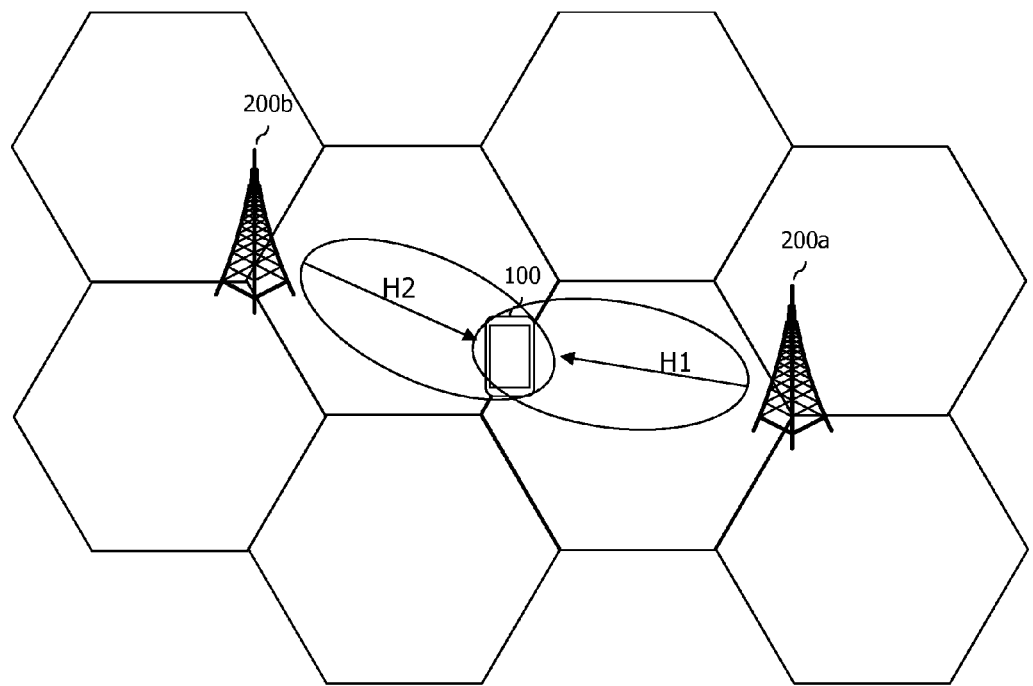
FIG. 14a and FIG. 14b are concept views illustrating a data transmission method using CoMP (Coordinated Multipoint Transmission).
Figure 14B:
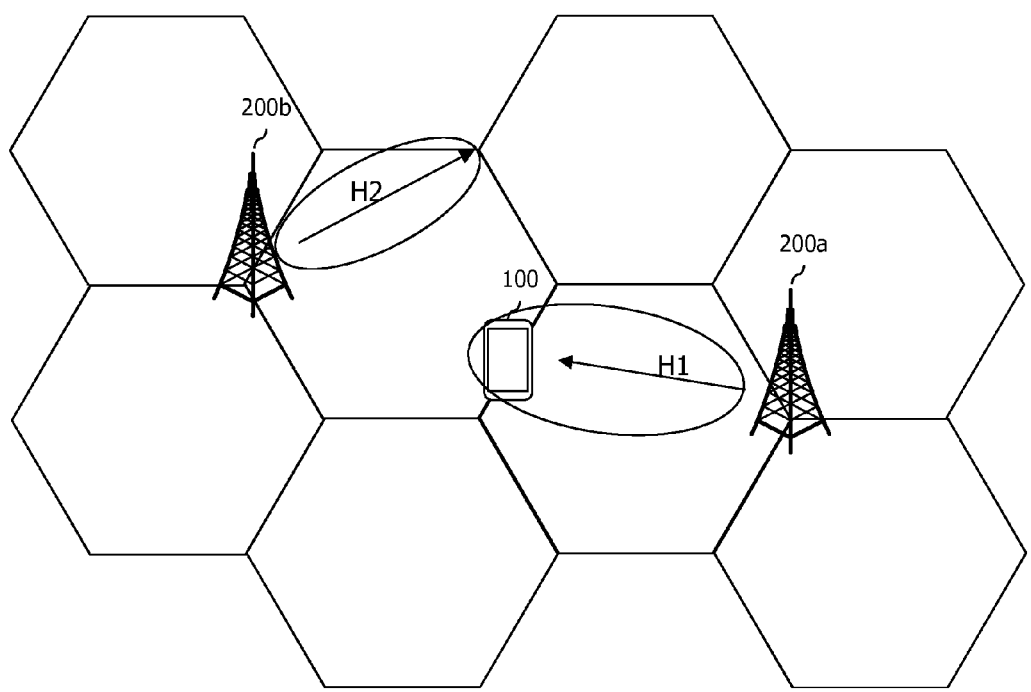

FIGS. 14a and 14b are concept views illustrating a data transmission method using CoMP (coordinated multipoint transmission).

In LTE, CoMP methods may be largely classified into joint processing (JP) and Coordination Scheduling (CS)/Coordination Beamforming (CB) depending on data transmission methods.

FIG. 14a illustrates joint processing (JP). Referring to FIG. 14a, joint processing (JP) refers to a method in which data for a UE 100 is transmitted while shared by one or more nodes 200a and 200b.

Joint processing (JP) may come in three modes (coherent joint transmission, non-coherent joint transmission, and dynamic point (Cell) selection) according to transmission methods. Coherent joint transmission denotes a method in which the UE 100 simultaneously processes received data using precoding between cells. Non-Coherent joint transmission denotes a method in which the UE 100 receives and processes an OFDM signal using soft combining.

DPS (dynamic point selection) may transmit data to the UE 100 using a method in which one cell (or node 200a) of a plurality of cells is in charge of transmission of data through a PDSCH (physical downlink shared channel) and another cell (or another node 200b) removes interference by muting. When the DPS is used, the transmitting/muting point (node) may be varied when in one sub-frame another sub-frame is transmitted or with respect to a resource block pair in one frame.

FIG. 14b illustrates CS/CB. Referring to FIG. 14b, CS/CB refers to a method in which transmission may be done from only one node (serving point, 200a) to the UE 100 or another node 200b cooperates with the serving point for scheduling or transmission beams to reduce interference. Further, as the CS/CB scheme, an SSPS (Semi-static point selection) scheme may be used. The SSPS denotes a scheme in which a particular UE 100 receives transmission from one point (or node or cell, 100a), and the transmission point transmitting data to the UE is semi-statically varied.

Meanwhile, the CoMP set refers to cells to which the CoMP operation applies among the cells carrier-aggregated by the UE. The cell to which the CoMP operation applies may indicate only the cell currently attending transmission/reception, signaling for CoMP, such as joint transmission (JT), dynamic cell selection (DCS), coordinated beam forming (CB), or coordinated scheduling (CS) or may encompass all of the cells that may be candidates to attend the same. A target cell whose CSI should be measured for CoMP operation is denoted a CoMP measurement set.

CoMP cell: means a cell belonging to a CoMP set.

The CoMP transmission point (TP) denotes a set of transmission points transmitting data to the UE. The CoMP transmission point (TP) may be a subset of a CoMP set. For JT, the CoMP transmission point (TP) may include multiple points in the CoMP set. For CS/CB, DPS, and SSPS, the CoMP transmission point (TP) may be one point in the CoMP set. For SSPS, the CoMP transmission point (TP) may be varied semi-statically in the CoMP set.

Figure 15:
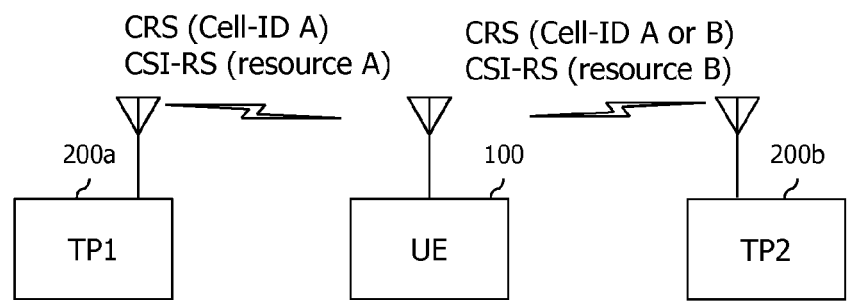
FIG. 15 illustrates an example of CoMP.

FIG. 15 illustrates an example of CoMP.

Referring to FIG. 15, two transmission points (TP) 200a and 200b and a UE 100 are shown. The two transmission points (TP) 200a and 200b each may be an eNodeB or an RRH (Remote radio head).

As can be seen from FIG. 15, the UE 100 may be positioned near the two transmission points (TP) 200a and 200b. The UE 100 may identify the property of the two transmission points 200a and 200b in order to correctly perform time and/or frequency sync and/or channel measurement with the two transmission points 200a and 200b. For example, the UE 100 may identify the property of the ports of reference signals related to the two transmission points 200a and 200b. In order to support the identification of the property, the UE 100 may consider particular antenna ports being quasi co-located. For example, the quasi co-located antenna ports may be indeed co-located in the same place (same transmission point, same antenna array, or same antenna). Or, the quasi co-located antenna ports have similar channel characteristics, but may be located in different transmission points (TP). At any rate, the UE 100, in its position, is interested in whether the UE 100 may figure out a large scale of property of an antenna port from a large scale of property of another particular antenna port. In other words, the UE 100 is not interested in whether the antenna ports are indeed co-located physically, but only in whether the property of the antenna ports is similar enough to do channel estimation, time sync, and/or frequency sync. As per the 3GPP 36.211 document, when a large scale of property of a channel where a symbol is transmitted on an antenna port can be obtained from a channel where a symbol is transmitted on another antenna port, two antenna ports can be said to be quasi co-located.

Meanwhile, to be said to be quasi co-located in the position of the UE 100, a pair of DM-RS and CSI-RS ports may be known by the network entity. By doing so, the UE 100 may do channel estimation on the CSI-RS port based on the DM-RS port. The network entity may make it known through an indirect signal or direct signal, e.g., an RRC signal.

Further, as can be seen from FIG. 15, for each CSI-RS resource, the network entity may inform that the CSI-RS port and CRS port of the cell are quasi co-located through an RRC signal considering the Doppler shift or Doppler spread. In this case, the RRC signal may include a cell ID for the quasi co-located CRS, number of CRS ports, and an MBSFN configuration.

Through the RRC signal, the UE 100 may be aware that the CSI-RS and the CRS are quasi co-located and determine that the frequency offset between the quasi co-located CRS and the DM-RS is nearly 0. That is, the CSI-RS and the CRS being quasi co-located considering the Doppler shift and Doppler spread means the frequency offset between the DM-RS and the quasi co-located CRS is nearly 0.

For example, when the DM-RS and the quasi co-located CRS are transmitted from the same transmission point (TP), the frequency offset may be nearly 0.

However, when the DM-RS and the quasi co-located CRS are transmitted from different transmission points (TP), a frequency offset between the DM-RS and the CRS may be present. In other words, when the network entity informs that the CSI-RS and the CRS are quasi co-located through an RRC signal but the CSI-RS and the CRS are transmitted from different transmission points (TP), the UE 100 may make a wrong determination that the frequency offset between the DM-RS and the CRS is nearly 0 although there is a frequency offset between the DM-RS and the CRS. Further, it might not be guaranteed that in the actual network environment the frequency offset between the DM-RS and the CRS is close to 0. As such, although in the actual environment the frequency offset is not close to 0, the UE 100, when receiving an RRC signal indicating that the CSI-RS and the CRS are quasi co-located from the network entity, abstains from frequency offset estimation and compensation for demodulation, thus detreating the performance.

Now described is an example in which a performance deterioration occurs through a simulation with reference to the drawings.

Here, the simulation has been conducted under the environment shown in the following table.

TABLE 7

| Parameter | Assumption |
| --- | --- |
| Scenario | when the network entity informs the UE that the CSI-RS and the CRS are quasi co-located through an RRC signal in the scenario where the DM-RS and the quasi co-located CRS are transmitted from different transmission points (TP). |
| Number of transmission points (TP) | Two transmission points |
| Channel model | EPA (Extended Pedestrian A), EVA (Extended Vehicular A), ETU (Extended Typical Urban) |
| System bandwidth | 10 MHz |

TABLE 7-continued

| Parameter | Assumption |
| --- | --- |
| Antenna configuration | 2 * 2 open loop |
| Number of allocated RBs (PRB) | 50 |
| Modulation and code rate | FRC, 64QAM 3/4, 16QAM 1/2, QPSK 1/3 |
| Frequency offset | [0, 200] Hz, increased by 50 Hz |

Figure 16:
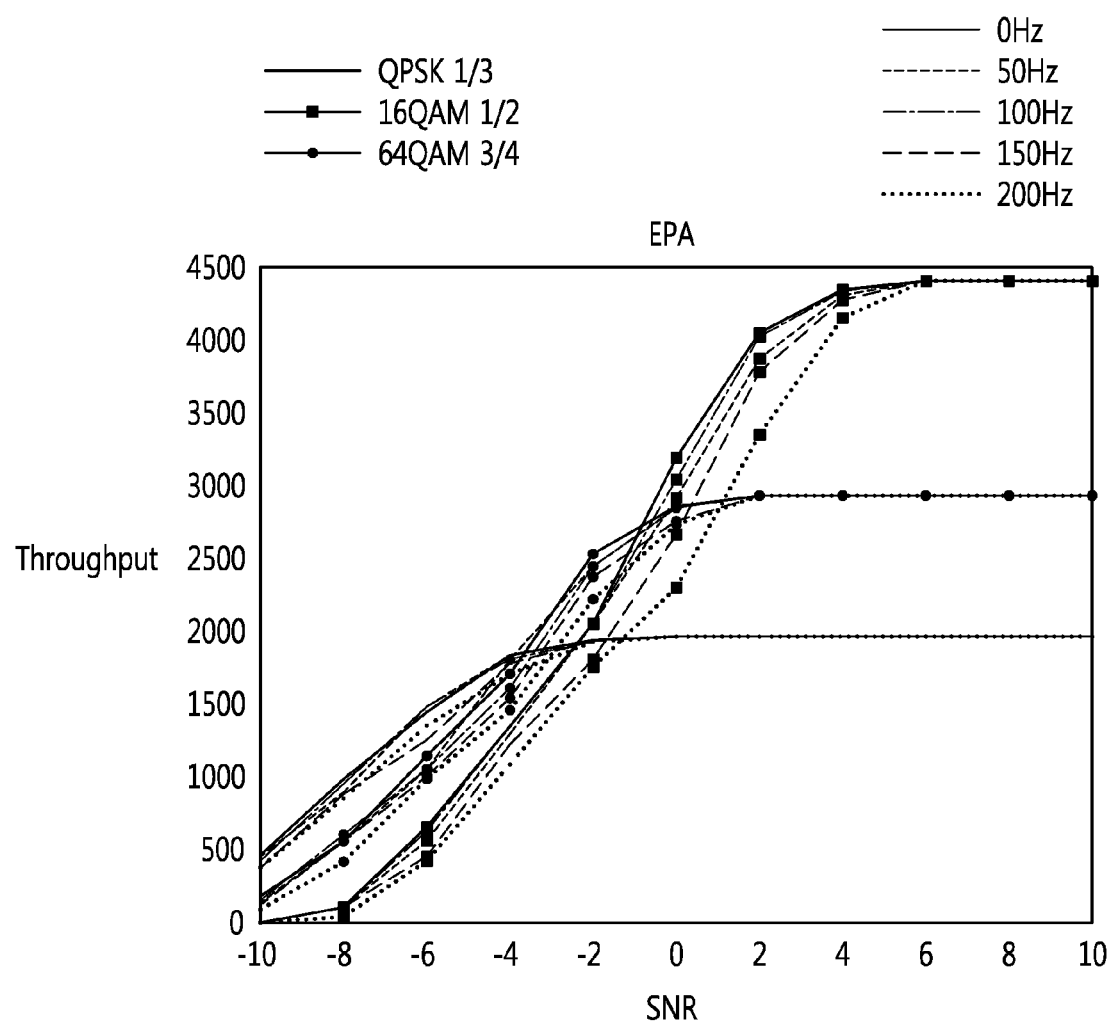
FIG. 16 is a view illustrating a result of simulation showing that a UE's modulation performance is deteriorated for each of QPSK, 16QAM, and 64QAM for an EPA (Extended Pedestrian A) model.
Figure 17A:
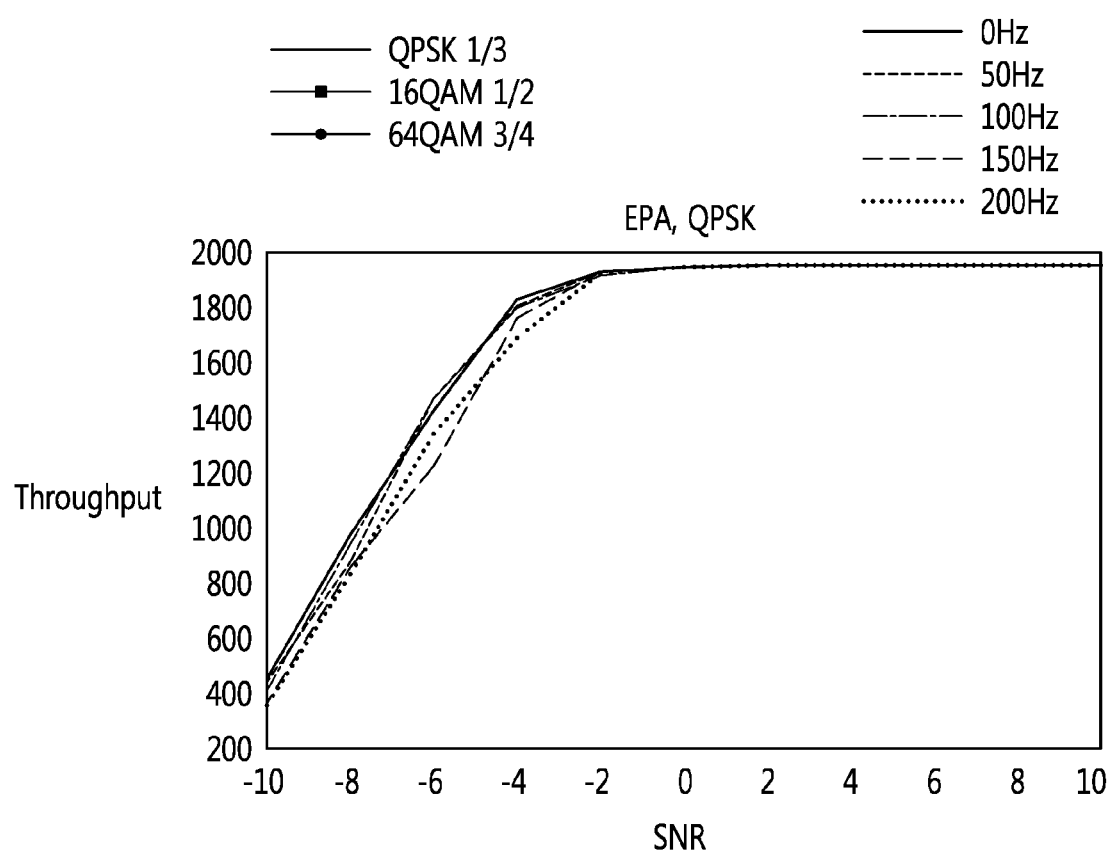
FIGS. 17a to 17c are views illustrating examples of simulation showing QPSK, 16QAM, and 64QAM, respectively, of FIG. 16.
Figure 17B:
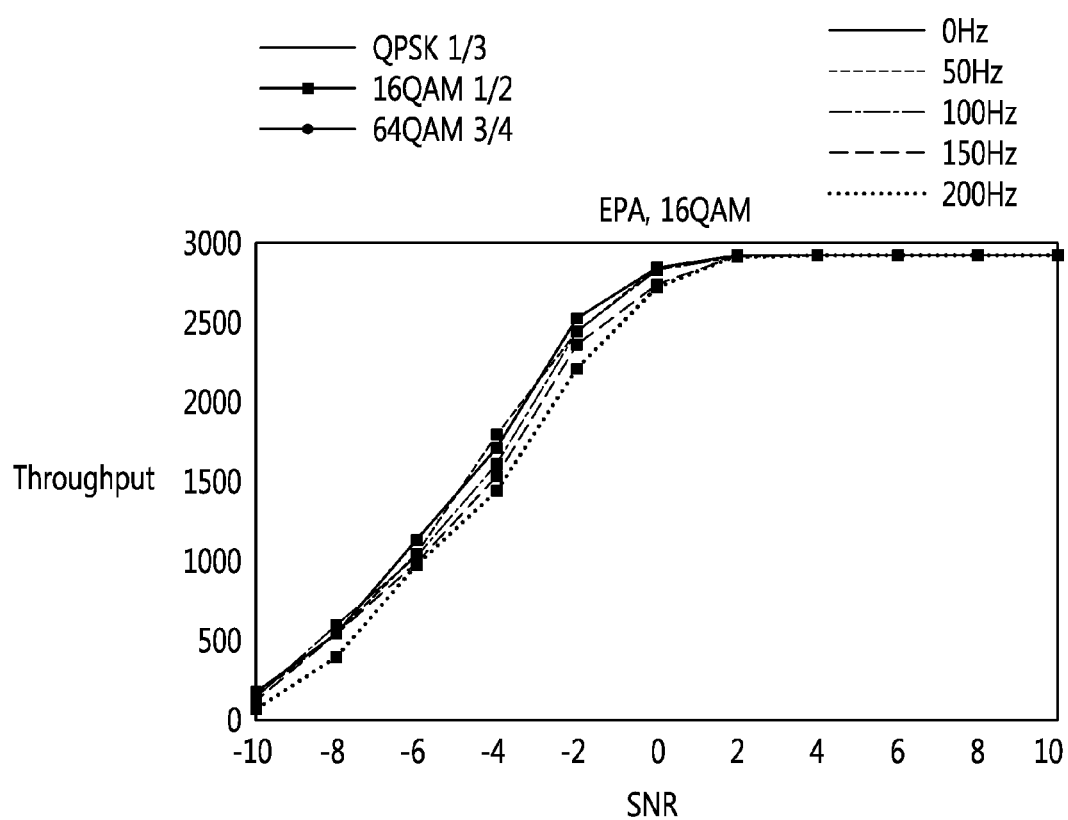
Figure 17C:
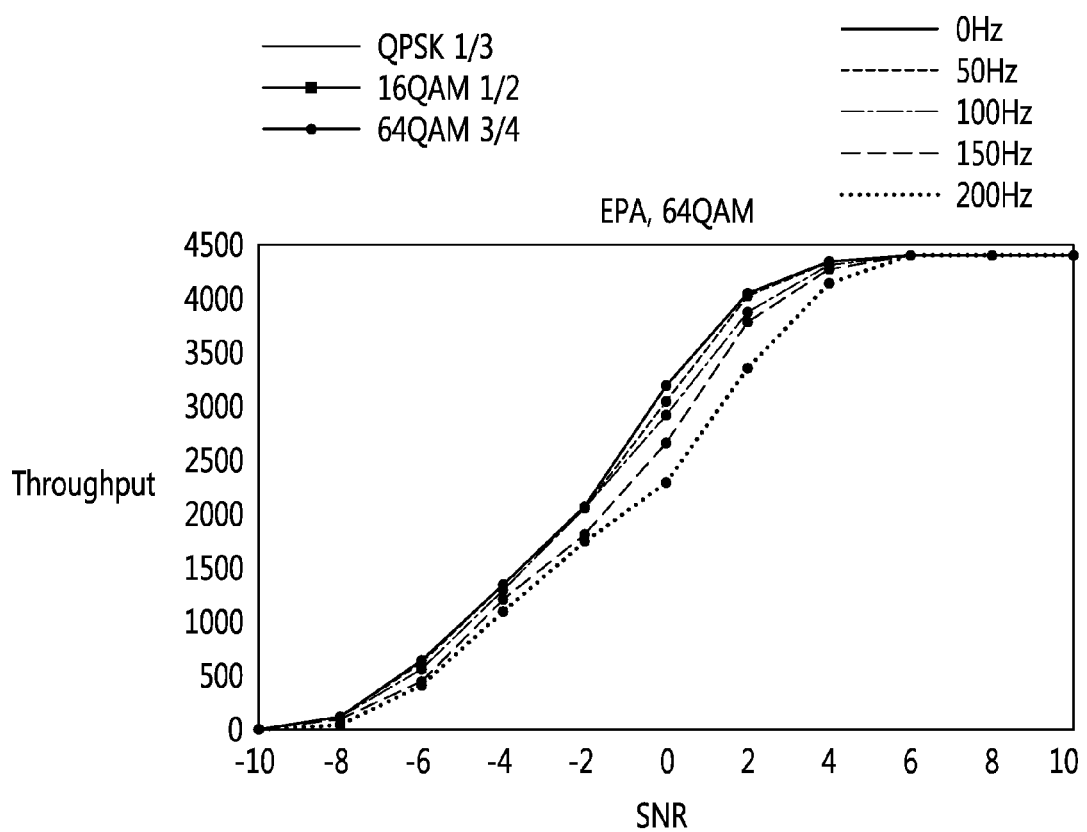
Figure 17D:
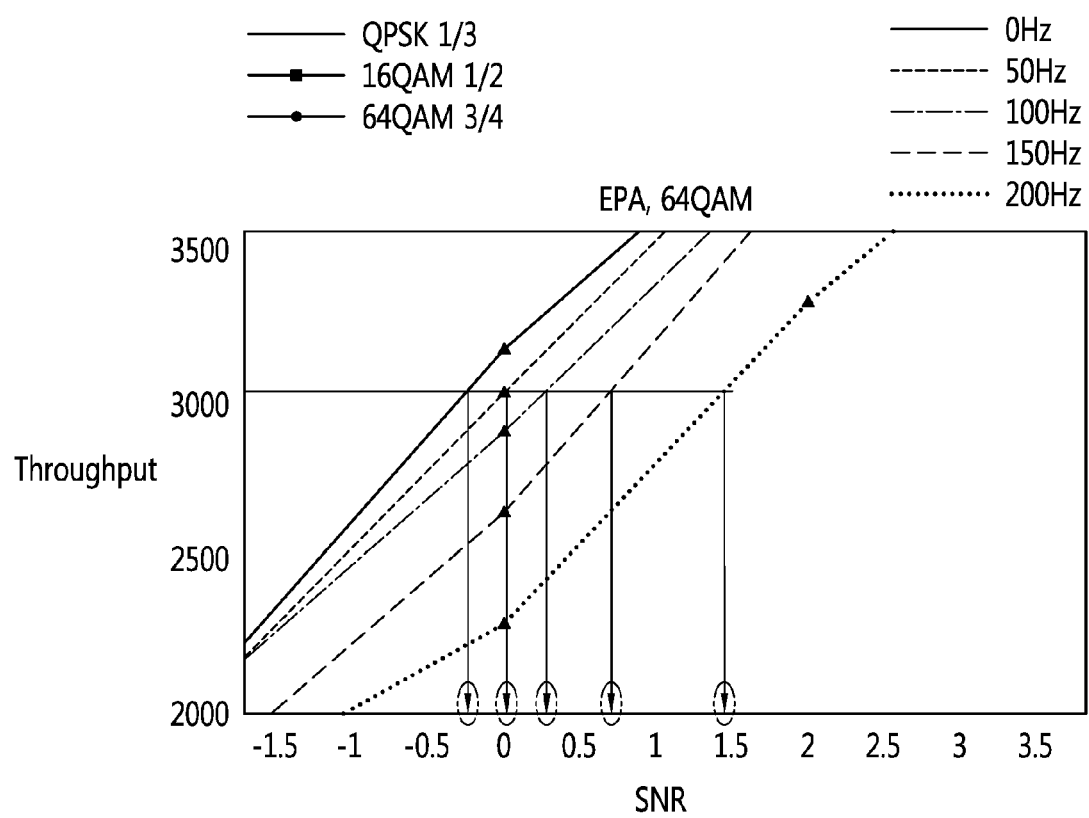
FIG. 17d is an expanded view of FIG. 17c.

FIG. 16 is a view illustrating a result of simulation showing that a UE's modulation performance is deteriorated for each of QPSK, 16QAM, and 64QAM for an EPA (Extended Pedestrian A) model. FIGS. 17*a* to 17*c* are views illustrating examples of simulation showing QPSK, 16QAM, and 64QAM, respectively, of FIG. 16. FIG. 17*d* is an expanded view of FIG. 17*c*.

Referring to FIGS. 16 and 17*a* to 17*c*, for an EPA model, the modulation performance of QPSK, 16QAM, and 64 QAM is decreased as the frequency offset increases from 0 Hz to 200 Hz.

In particular, as can be seen from FIG. 17*d*, assuming that the performance requirement of a CoMP UE is determined to be SNR 1 with respect to the frequency offset of 0 Hz, the value of SNR 2 corresponding to the frequency offset of 50 Hz may meet the performance requirements of the CoMP UE given a tolerance for the performance requirement of SNR 1. However, when the frequency offset is larger than 50 MHz, the CoMP UE requires an SNR value higher than the performance requirement and thus might not guarantee the CoMP performance.

Figure 18:
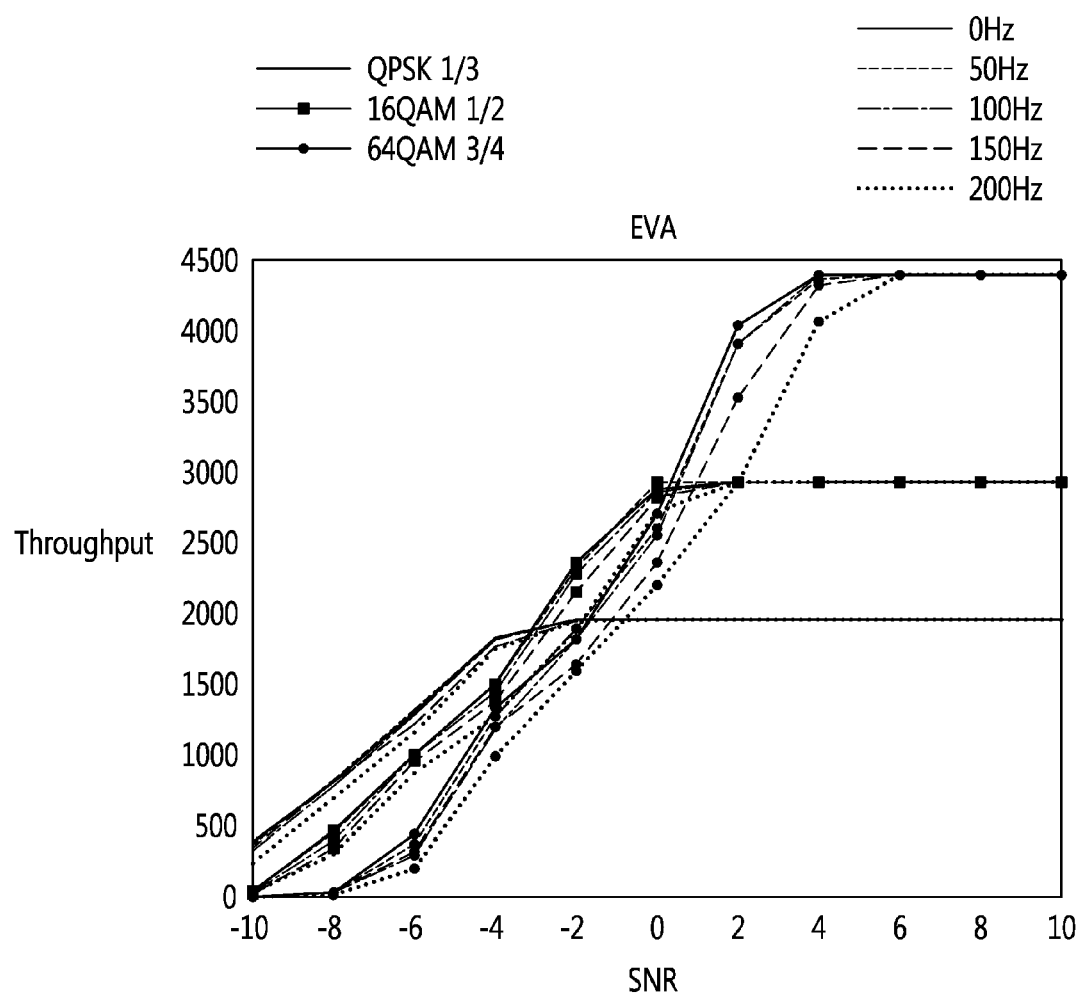
FIG. 18 is a view illustrating a result of simulation showing that a UE's modulation performance is deteriorated for each of QPSK, 16QAM, and 64QAM for an EVA (Extended Vehicular A) model.
Figure 19A:
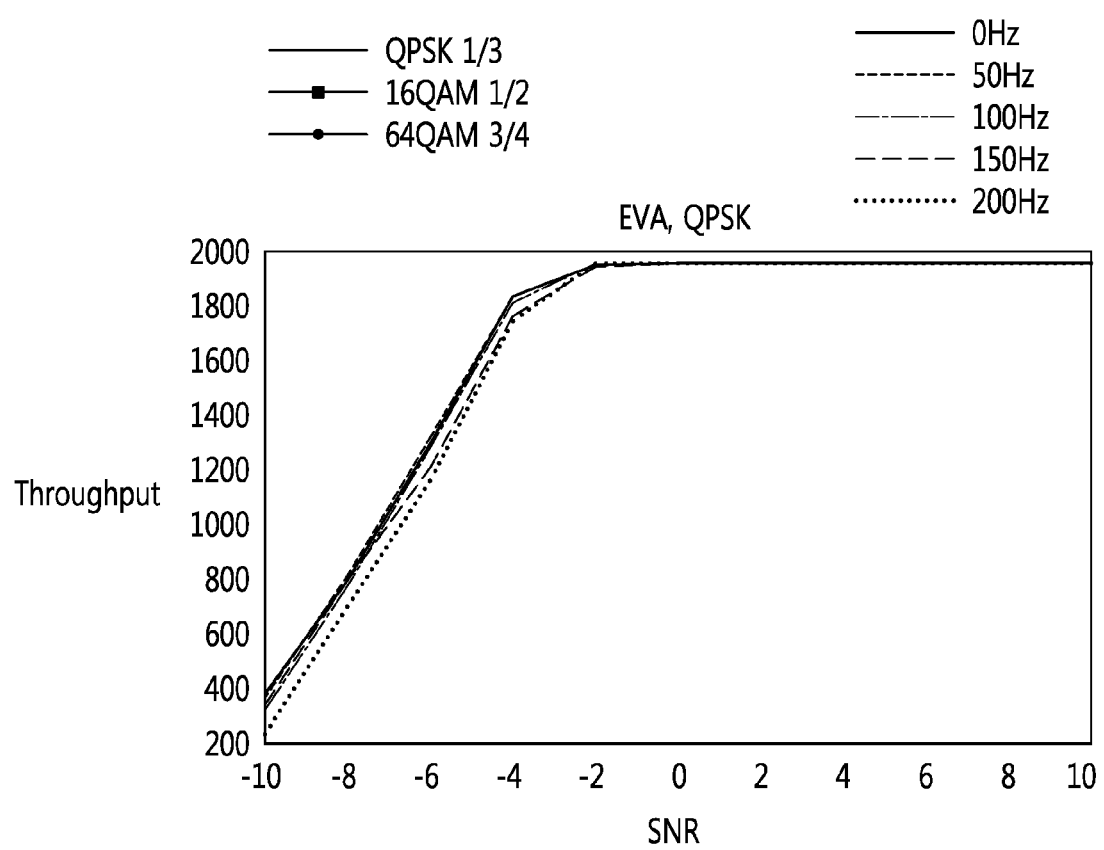
FIGS. 19a to 19c are views illustrating examples of simulation showing QPSK, 16QAM, and 64QAM, respectively, of FIG. 18.
Figure 19B:
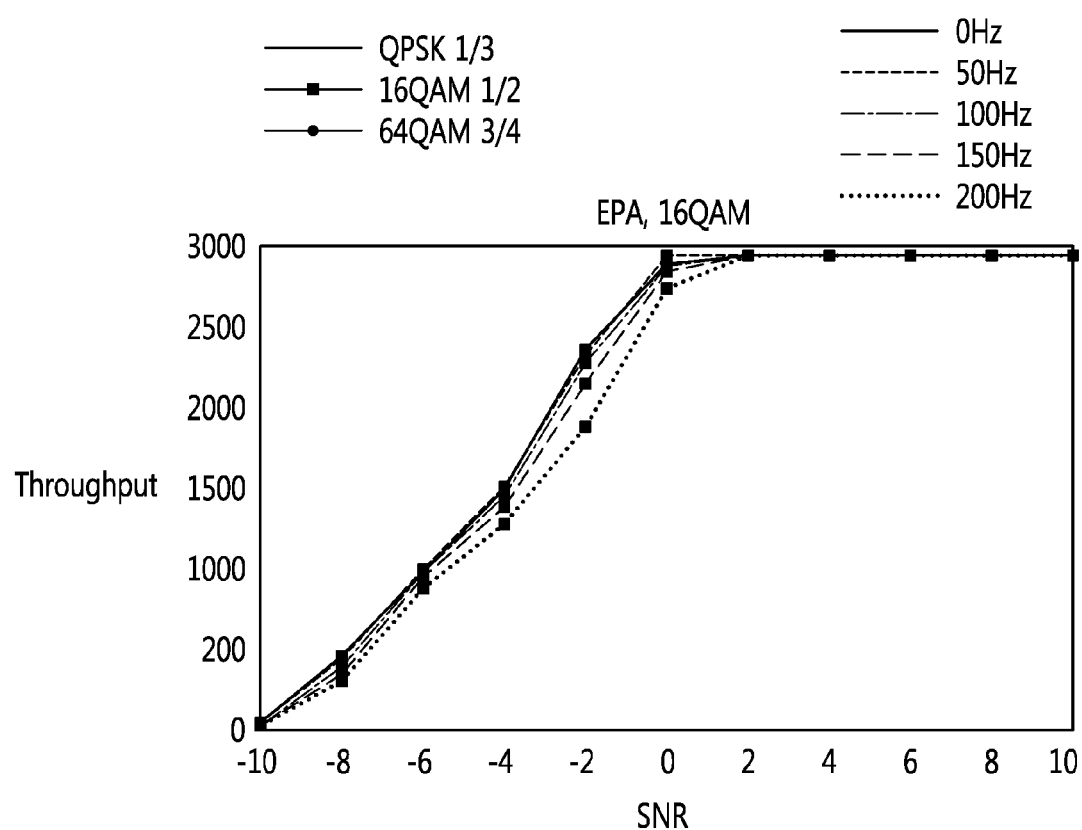
Figure 19C:
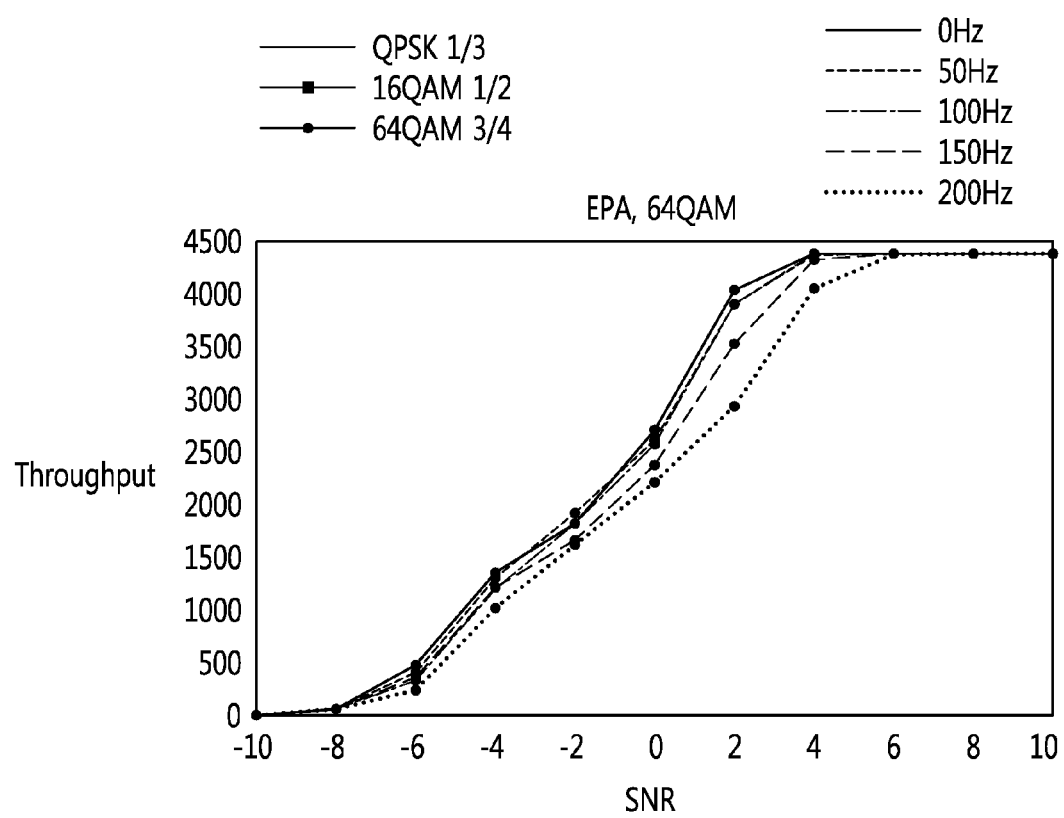
Figure 19D:
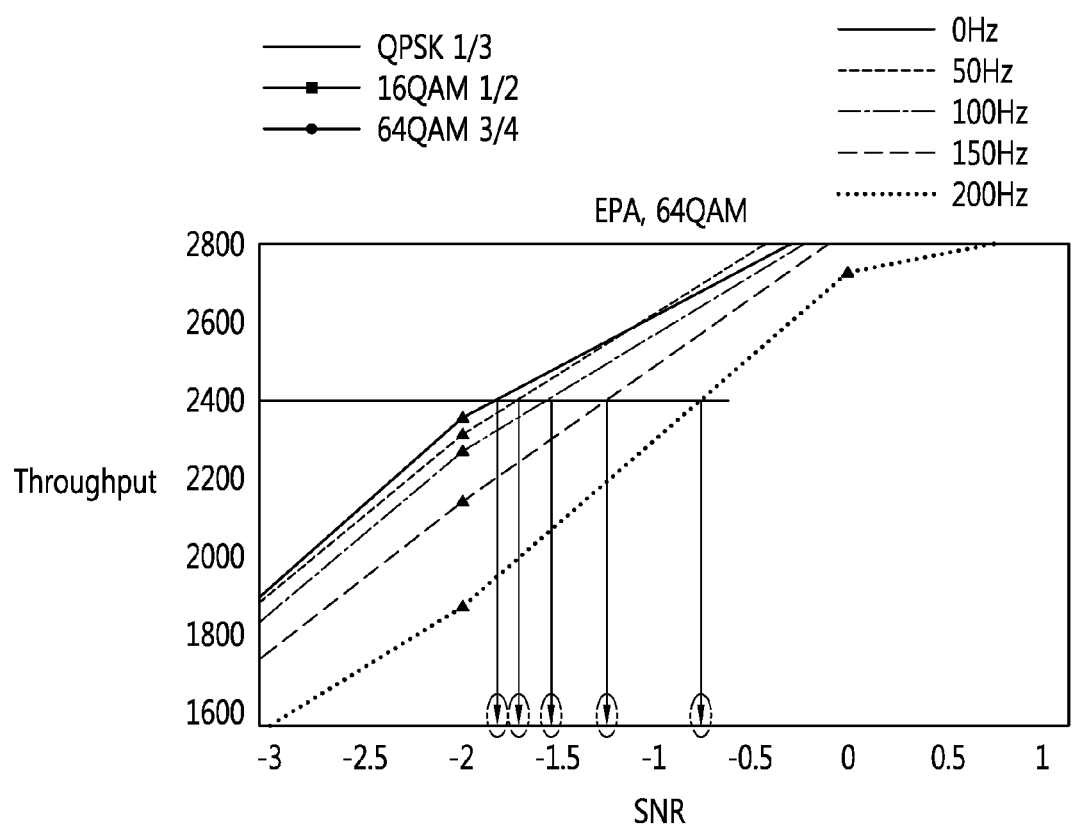
FIG. 19d is an expanded view of FIG. 19c.

FIG. 18 is a view illustrating a result of simulation showing that a UE's modulation performance is deteriorated for each of QPSK, 16QAM, and 64QAM for an EVA (Extended Vehicular A) model. FIGS. 19*a* to 19*c* are views illustrating examples of simulation showing QPSK, 16QAM, and 64QAM, respectively, of FIG. 18. FIG. 19*d* is an expanded view of FIG. 19*c*.

Referring to FIGS. 18 and 19*a* to 19*c*, for an EVA model, the modulation performance of QPSK, 16QAM, and 64QAM may be likewise reduced as the frequency offset increases from 0 Hz to 200 Hz.

In particular, as can be seen from FIG. 19*d*, assuming that the performance requirement of a CoMP UE is determined as SNR 1 with respect to the frequency offset of 0 Hz, the SNR 2 value corresponding to the frequency offset of 50 Hz may meet the performance requirement of the CoMP UE considering the tolerance for the performance requirement of SNR 1. However, when the frequency offset is larger than 50 MHz, the CoMP UE needs an SNR value higher than the performance requirement, thus failing to guarantee the CoMP performance.

Figure 20:
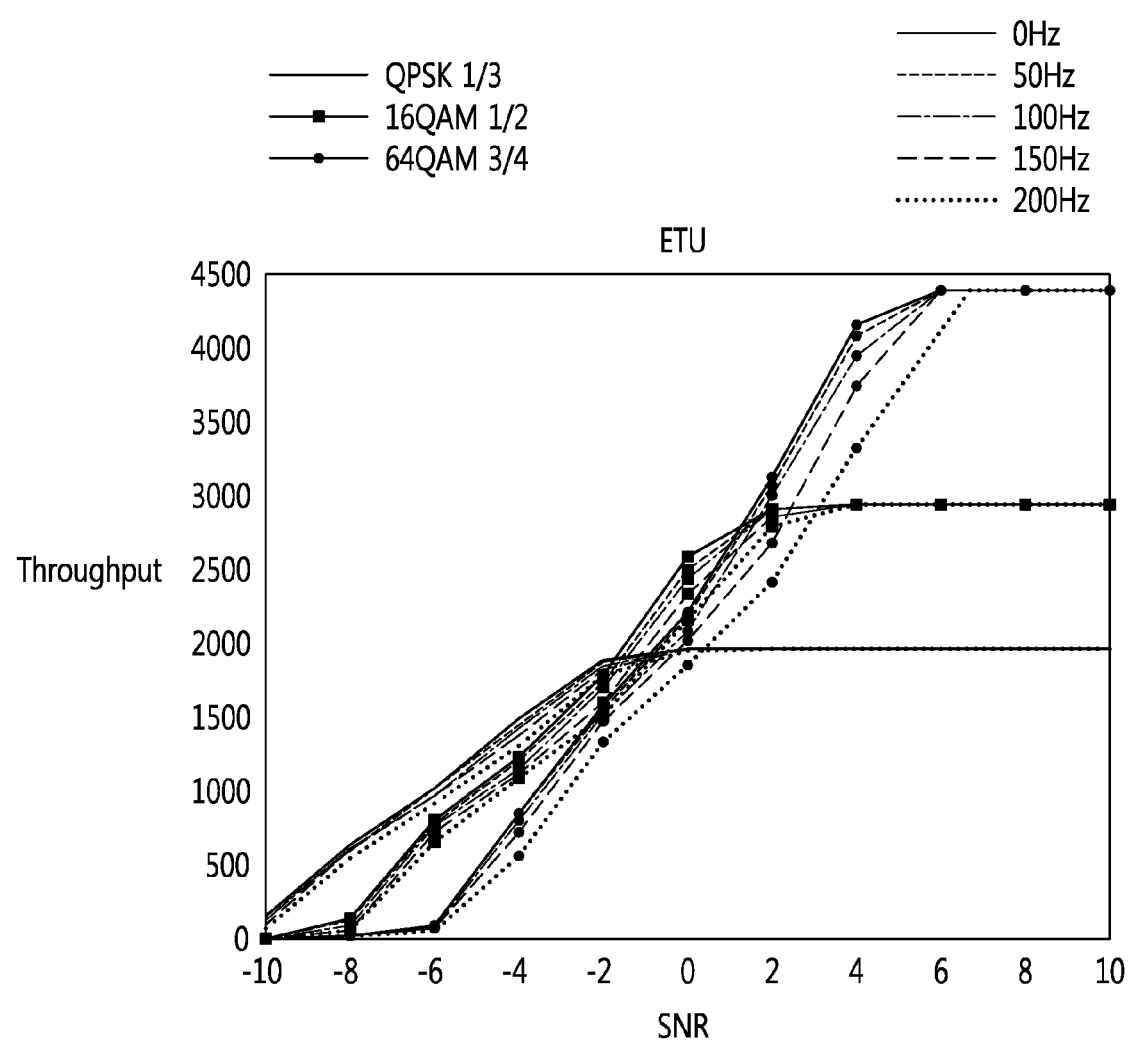
FIG. 20 is a view illustrating a result of simulation showing that a UE's modulation performance is deteriorated for each of QPSK, 16QAM, and 64QAM for an ETU (Extended Typical Urban) model.
Figure 21A:
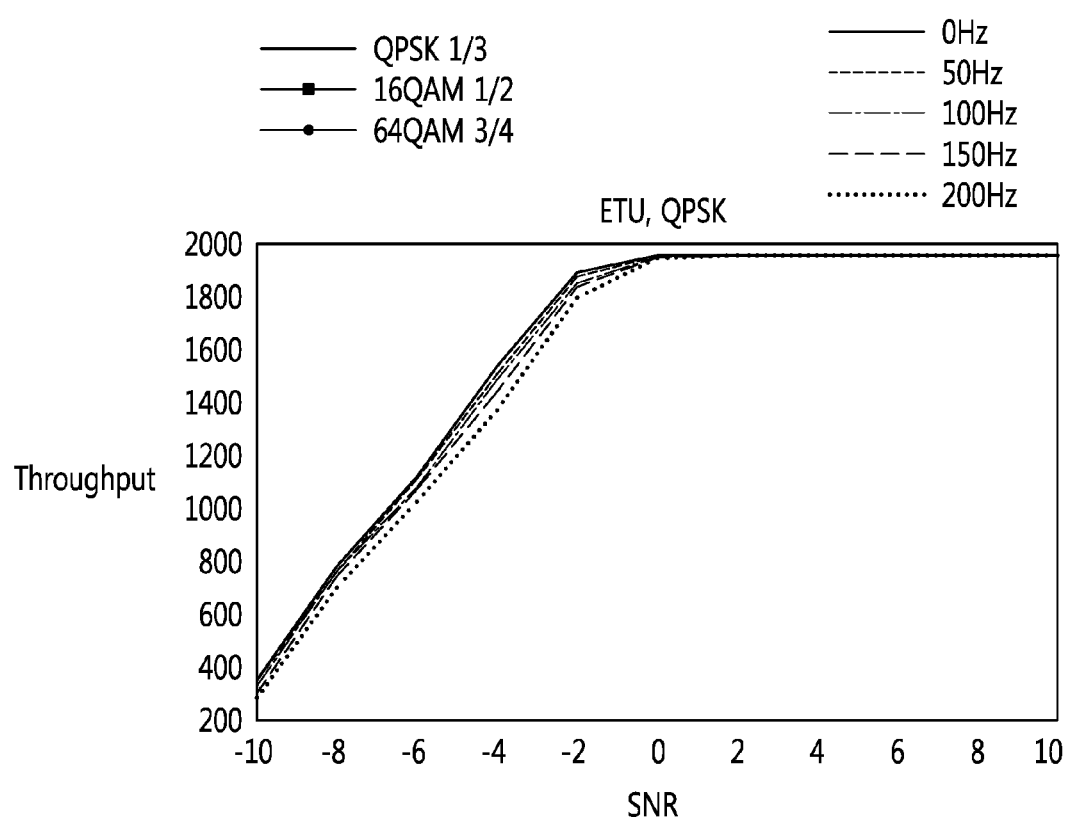
FIGS. 21a to 21c are views illustrating examples of simulation showing QPSK, 16QAM, and 64QAM, respectively, of FIG. 20.
Figure 21B:
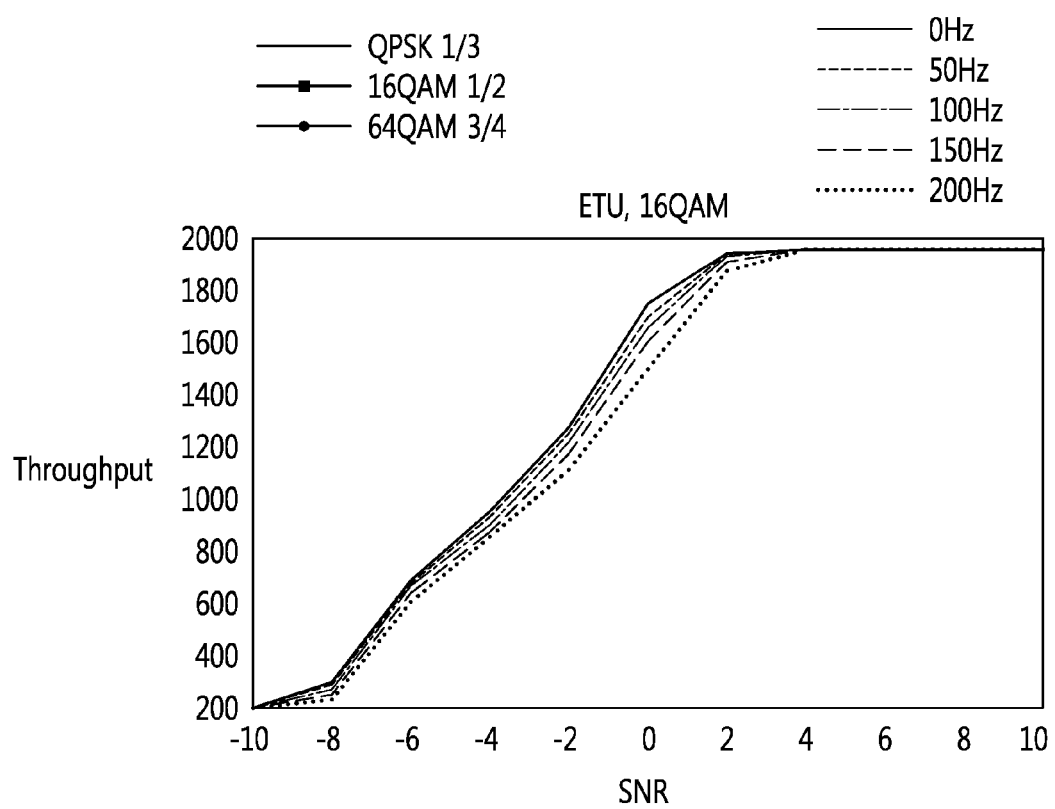
Figure 21C:
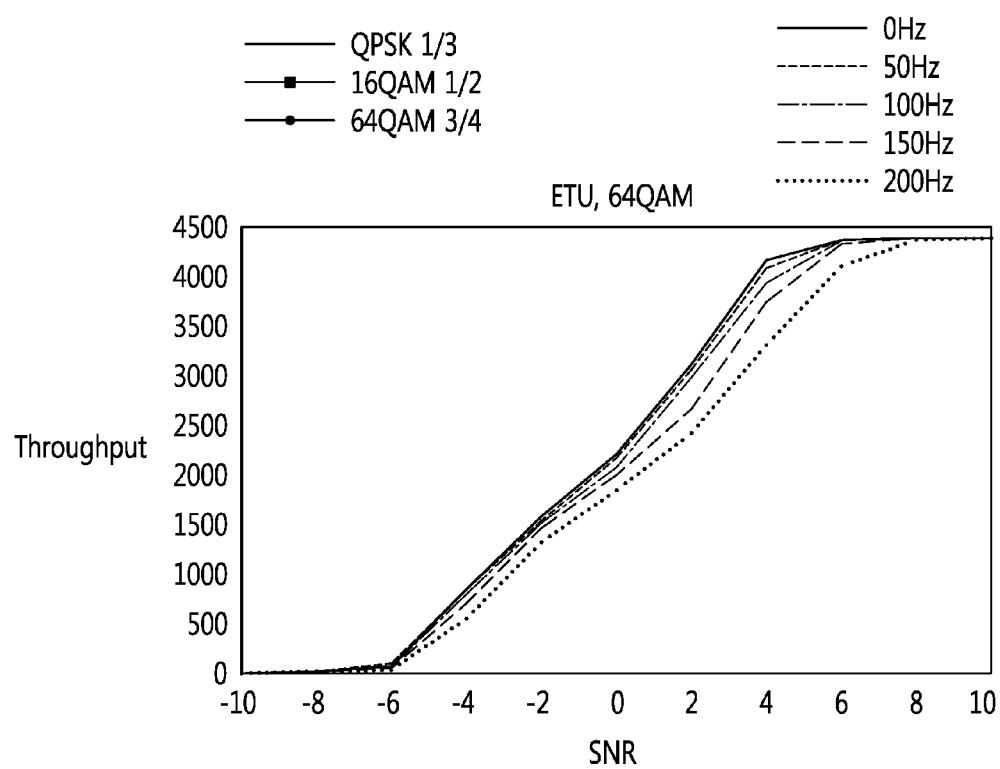
Figure 21D:
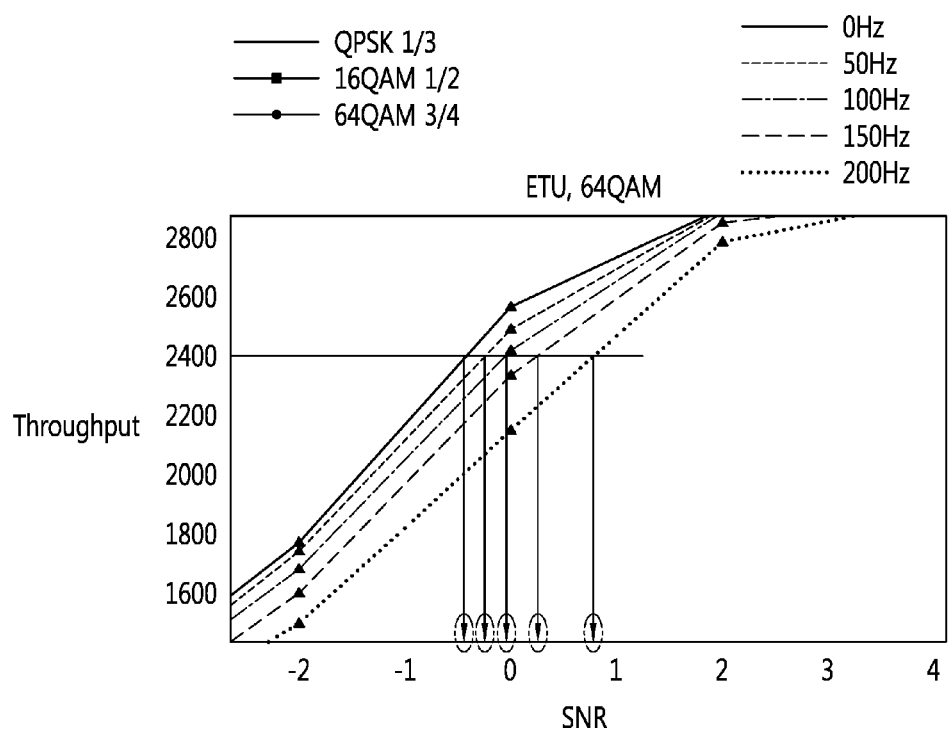
FIG. 21d is an expanded view of FIG. 21c.

FIG. 20 is a view illustrating a result of simulation showing that a UE's modulation performance is deteriorated for each of QPSK, 16QAM, and 64QAM for an ETU (Extended Typical Urban) model. FIGS. 21*a* to 21*c* are views illustrating examples of simulation showing QPSK, 16QAM, and 64QAM, respectively, of FIG. 20. FIG. 21*d* is an expanded view of FIG. 21*c*.

Referring to FIGS. 20 and 21*a* to 21*c*, for an ETU model, the modulation performance of QPSK, 16QAM, and 64QAM is likewise reduced as the frequency offset increases from 0 Hz to 200 Hz.

In particular, as can be seen from FIG. 21*d*, assuming that the performance requirement of a CoMP UE is determined as SNR 1 with respect to the frequency offset of 0 Hz, the SNR 2 value corresponding to the frequency offset of 50 Hz may meet the performance requirement of the CoMP UE considering a tolerance for the performance requirement of SNR 1. However, when the frequency offset is larger than 50 MHz, the CoMP UE needs an SNR value higher than the performance requirement, thus failing to guarantee the CoMP performance.

Resultantly, as shown in the results of the simulation of the figures, in the scenario where the DM-RS and the quasi co-located CRS are transmitted from different transmission points (TP), the network entity informs the UE that the CSI-RS and the CRS are quasi co-located through the RRC signal, but actually when a frequency offset is present, the UE's modulation performance may be reduced. In particular, the UE's modulation performance, given a tolerance, may meet the performance requirement of the CoMP UE only up to 50 MHz.

Resultantly, considering the simulation result, the frequency offset needs to be protected to some degree to meet the UE's performance requirement.

Specifically, the protection is that, given the simulation result, the frequency offset is preferably within 50 MHz to meet the UE's performance requirement. Specifically, when the CRS and the PDSCH are transmitted from different transmission points (TP), the frequency offset is preferably within 50 MHz.

Figure 22:
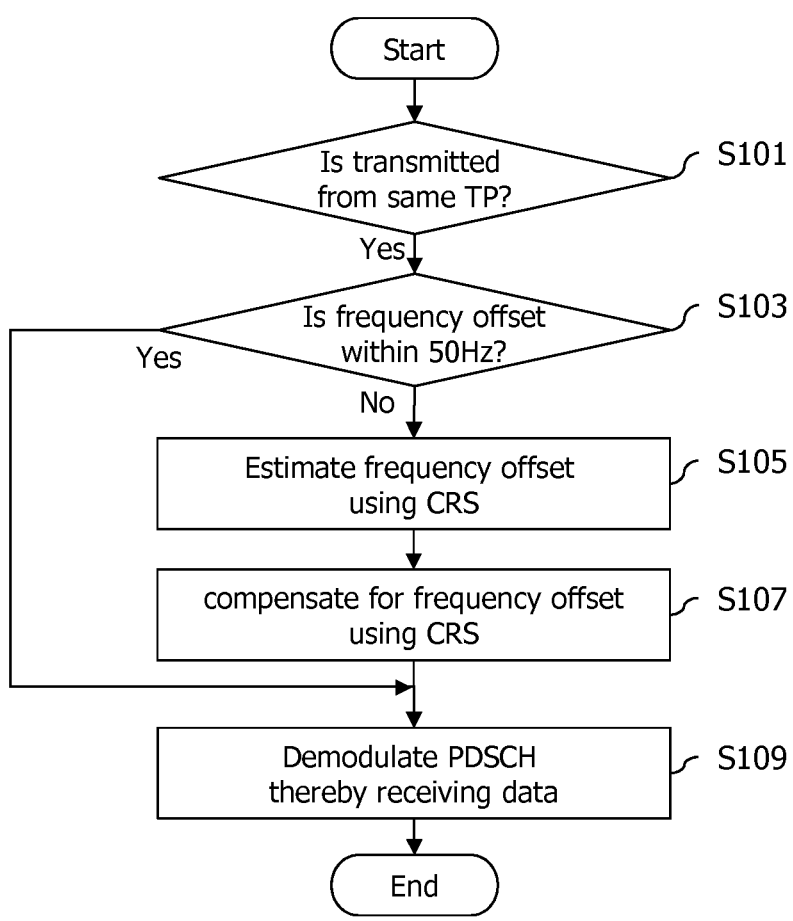
FIG. 22 is a flowchart illustrating a scheme to prevent a performance deterioration when a frequency offset is present according to an embodiment of the present invention.

FIG. 22 is a flowchart illustrating a scheme to prevent a performance deterioration when a frequency offset is present according to an embodiment of the present invention.

As described above, the frequency offset is preferably within 50 Hz. However, unless the frequency offset may be limited, the UE 100 needs a scheme to compensate for the frequency offset. That is, although the CRS and DM-RS transmitted from different transmission points (TP) are quasi co-located, a frequency offset is highly likely to occur in the actual network environment. When the frequency offset cannot be limited, the UE 100 may compensate for the frequency offset by the scheme proposed herein. Specifically, the UE 100 may estimate the frequency offset by always performing a frequency tracking operation with the CSI-RS or DM-RS and may compensate for the estimated frequency offset for data demodulation.

Referring to FIG. 22, when the UE 100 identifies through an RRC signal that the CSI-RS port and CRS port of the cell are quasi co-located (S101), the UE 100 determines through the same that the frequency offset between the DM-RS and the quasi co-located CRS is nearly 0.

Nonetheless, the UE 100 performs a frequency tracking operation to determine whether the frequency offset within 50 MHz (S103).

Unless the frequency offset is 50 Hz, the UE 100 estimates the frequency offset using the CRS (S105).

The UE 100 compensates for the estimated frequency offset using the CRS (S107).

The UE 100 demodulates the PDSCH using the DM-RS by the compensated frequency offset and receives data (S109).

Since the above-described processes need to be always performed in addition to the basic transmission tracking through the CRS, the UE may be unnecessarily complicated or consume more power.

Further, unless the CRS is transmitted from the TP where the CSI-RS and DM-RS are transmitted, the UE cannot perform frequency offset estimation and compensation and thus the UE may experience a performance deterioration.

Thus, the optimal scheme is to allow the frequency offset to remain within 50 MHz as described above.

The embodiments herein may be implemented through various means. For example, the embodiments of the present invention may be implemented in firmware, software, or a combination thereof. A specific example is described below with reference to FIG. 19.

Figure 23:
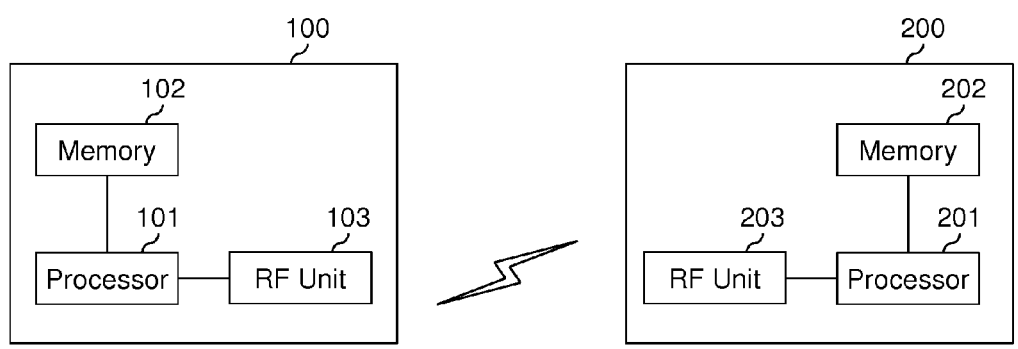
FIG. 23 is a block diagram illustrating a wireless communication system where an embodiment of the present invention is implemented.

FIG. 23 is a block diagram illustrating a wireless communication system where an embodiment of the present invention is implemented.

The base station 200 includes a processor 201, a memory 202, and an RF (radio frequency) unit 203. The memory 202 is connected with the processor 201 and stores various types of information for driving the processor 201. The RF unit 203 is connected with the processor 201 and communicates radio signals. The processor 201 implements functions, processes, and/or methods as proposed herein. In the above-described embodiments, the operation of the base station may be implemented by the processor 51.

The wireless device 100 includes an RF unit 110, a processor 120, and a memory 130. The memory 130 is connected with the processor 121 and stores various types of information for driving the processor 121. The RF unit 110 is connected with the processor 120 and communicates radio signals. The processor 120 implements functions, processes, and/or methods as proposed herein. In the above-described embodiments, the operation of the wireless device may be implemented by the processor 120.

The processor may include an ASIC (application-specific integrated circuit), other chipset, a logic circuit, and/or a data processing device. The memory may include a ROM (Read-Only Memory), a RAM (Random Access Memory), a flash memory, a memory card, a storage medium, and/or other storage device. The RF unit may include a baseband circuit for processing radio signals. When an embodiment is implemented in software, the above-described schemes may be embodied in modules (processes, or functions, etc.) performing the above-described functions. The modules may be stored in the memory and executed by the processor. The memory may be positioned in or outside the processor and may be connected with the processor via various well-known means.

In the above-described example system, the methods are described based on the flowcharts with a series of steps or blocks, but the present invention is not limited to the order of the steps, and rather, some steps may be performed simultaneously or in different order with other steps. It should be appreciated by one of ordinary skill in the art that the steps in the flowcharts do not exclude each other and that other steps may be added to the flowcharts or some of the steps may be deleted from the flowcharts without influencing the scope of the present invention.

What is claimed is:

1. A receiving method by a user equipment (UE) supporting CoMP (Cooperative Multi-Point), the receiving method comprising:

receiving a signal indicating that a channel state indicator-reference signal (CSI-RS) port and a cell-specific reference signal (CRS) port are quasi co-located; and determining a frequency offset between the CRS and a quasi co-located demodulation-reference signal (DM-RS) based on the signal indicating that the CSI-RS port and the CRS port are quasi co-located, wherein the frequency offset between the CRS and the DM-RS is within 50 Hz, wherein the determining step of the frequency offset includes:

determining whether the CRS and the quasi co-located DM-RS are received from the same transmission port (TP); and unless receiving the same transmission point (TP), estimating a frequency offset between the CRS and the quasi co-located DM-RS.

2. The method of claim 1, wherein the signal is a radio resource control (RRC) signal.

3. The method of claim 2, wherein the RRC signal includes one or more of a cell ID for the quasi co-located CRS and information on the number of CRS ports.

4. The method of claim 1, further comprising compensating for the frequency offset using the CRS when the frequency offset between the CRS and the DM-RS is larger than 50 Hz.

5. The method of claim 1, further comprising demodulating a physical downlink shared channel (PDSCH) using the DM-RS to receive data.

6. A user equipment (UE) supporting CoMP (cooperative multi-point), the UE comprising:

a radio frequency (RF) unit receiving a signal indicating that a channel state indicator-reference signal (CSI-RS) port and a cell-specific reference signal (CRS) port are quasi co-located; and a processor controlling the RF unit and determining a frequency offset between the CRS and a quasi co-located demodulation-reference signal (DM-RS) based on the signal indicating that the CSI-RS port and the CRS port are quasi co-located, wherein the frequency offset between the CRS and the DM-RS is within 50 Hz, wherein the processor determining the frequency offset determines whether the CRS and the quasi co-located DM-RS are received from the same transmission port (TP), and unless receiving the same transmission point (TP), estimates a frequency offset between the CRS and the quasi co-located DM-RS.

7. The UE of claim 6, wherein the signal is a radio resource control (RRC) signal.

8. The UE of claim 7, wherein the RRC signal includes one or more of a cell ID for the quasi co-located CRS and information on the number of CRS ports.

9. The UE of claim 6, wherein the processor compensates for the frequency offset using the CRS when the frequency offset between the CRS and the DM-RS is larger than 50 Hz.

\* \* \* \* \*